(12) United States Patent
Dural et al.

(10) Patent No.: US 8,804,693 B2
(45) Date of Patent: Aug. 12, 2014

(54) REVERSE LINK THROUGHPUT MANAGEMENT FOR FLEXIBLE BANDWIDTH SYSTEMS

(75) Inventors: Ozgur Dural, San Diego, CA (US);
Soumya Das, San Diego, CA (US);
Edwin C. Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 163 days.

(21) Appl. No.: 13/457,360

(22) Filed: Apr. 26, 2012

(65) Prior Publication Data

US 2013/0114436 A1  May 9, 2013

Related U.S. Application Data

(60) Provisional application No. 61/556,777, filed on Nov. 7, 2011, provisional application No. 61/568,742, filed on Dec. 9, 2011.

(51) Int. Cl.

| | | |
|---|---|---|
| H04L 12/28 | (2006.01) | |
| H04W 72/04 | (2009.01) | |
| H04W 72/08 | (2009.01) | |
| H04W 24/10 | (2009.01) | |
| H04W 72/12 | (2009.01) | |
| H04W 52/24 | (2009.01) | |
| H04W 16/14 | (2009.01) | |
| H04W 52/44 | (2009.01) | |
| H04W 52/40 | (2009.01) | |
| H04W 52/14 | (2009.01) | |

(52) U.S. Cl.
CPC .......... *H04W 72/0453* (2013.01); *H04W 72/04* (2013.01); *H04W 72/1215* (2013.01); *Y02B 60/50* (2013.01); *H04W 72/1273* (2013.01); *H04W 52/247* (2013.01); *H04W 72/082* (2013.01); *H04W 24/10* (2013.01); *H04W 16/14* (2013.01); *H04W 52/44* (2013.01); *H04W 52/40* (2013.01); *H04W 52/146* (2013.01)
USPC ........................................................ 370/351

(58) Field of Classification Search
CPC ..... H04W 16/14; H04W 72/02; H04W 84/12; H04W 72/082; H04W 88/06
USPC .................. 379/111, 114.01, 114.06, 114.07; 370/351, 389, 395.1, 395.4, 395.41, 370/395.21
See application file for complete search history.

(56) References Cited

U.S. PATENT DOCUMENTS 7,050,452 B2    5/2006 Sugar et al.
7,126,984 B2 *  10/2006 Wang ........................... 375/222

(Continued)

OTHER PUBLICATIONS

Co-pending U.S. Appl. No. 13/707,111, filed Dec. 6, 2012.

(Continued)

*Primary Examiner* — Fan Ng
(74) *Attorney, Agent, or Firm* — Jeffrey D. Jacobs

(57) ABSTRACT

Methods, systems, and devices for increasing reverse link throughput by coordination of multiple wireless systems using reverse link blanking are provided. Some embodiments involve utilizing the bandwidth of one carrier bandwidth that partially overlaps with the bandwidth of another carrier bandwidth. This overlap may create interference. Different indicators may be utilized to prompt a device, such as a mobile device, to coordinate reverse link transmission blanking on at least one of the carrier bandwidths to increase throughput for the other overlapping carrier bandwidth. For example, a base station may transmit such an indicator to the mobile device to prompt the transmission blanking. Some embodiments also include increasing transmission power for the overlapping carrier bandwidth during the transmission blanking of other carrier bandwidth. Some embodiments utilize flexible carrier bandwidths systems that may utilize portions of spectrum that may not be big enough to fit a normal bandwidth waveform.

60 Claims, 16 Drawing Sheets

(56) References Cited

U.S. PATENT DOCUMENTS

| | | | |
|---|---|---|---|
| 7,362,776 B2 * | 4/2008 | Meier et al. | 370/468 |
| 7,492,761 B1 * | 2/2009 | Farr et al. | 370/389 |
| 8,000,286 B1 | 8/2011 | Barbee et al. | |
| 8,488,633 B2 * | 7/2013 | Bahl et al. | 370/478 |
| 2008/0151849 A1 * | 6/2008 | Utsunomiya et al. | 370/338 |
| 2009/0046625 A1 * | 2/2009 | Diener et al. | 370/319 |
| 2009/0316645 A1 * | 12/2009 | Uemura et al. | 370/329 |
| 2010/0322287 A1 | 12/2010 | Truong et al. | |
| 2011/0096783 A1 * | 4/2011 | Cai et al. | 370/395.4 |
| 2011/0151790 A1 | 6/2011 | Khandekar et al. | |
| 2012/0039284 A1 * | 2/2012 | Barbieri et al. | 370/329 |
| 2013/0114415 A1 | 5/2013 | Das et al. | |
| 2013/0114433 A1 | 5/2013 | Park et al. | |
| 2013/0114473 A1 | 5/2013 | Awoniyi et al. | |
| 2013/0114566 A1 | 5/2013 | Awoniyi et al. | |
| 2013/0114571 A1 | 5/2013 | Das et al. | |
| 2013/0115967 A1 | 5/2013 | Soliman et al. | |
| 2013/0115991 A1 | 5/2013 | Awoniyi et al. | |
| 2013/0115994 A1 | 5/2013 | Awoniyi et al. | |
| 2013/0121265 A1 | 5/2013 | Awoniyi et al. | |
| 2013/0148520 A1 | 6/2013 | Das et al. | |
| 2013/0148527 A1 | 6/2013 | Awiniyi et al. | |
| 2013/0148576 A1 | 6/2013 | Huang et al. | |
| 2013/0148579 A1 | 6/2013 | Das et al. | |
| 2013/0148627 A1 | 6/2013 | Das et al. | |
| 2013/0148628 A1 | 6/2013 | Das et al. | |
| 2013/0148629 A1 | 6/2013 | Das et al. | |
| 2013/0150045 A1 | 6/2013 | Das et al. | |
| 2013/0182655 A1 | 7/2013 | Das et al. | |

OTHER PUBLICATIONS jialinzoualphalcatel-lucent com : "HRPDSilenceParameter Message Tunneling Clarification", 3GPP2 Draft; C20-20090615-020-ALU HRPDSilenceParameters, 3rd Generation Partnership Project 2, 3GPP2, 2500 Wilson Boulevard, Suite 300, Arlington, Virginia 22201; USA, vol. TSGC Jun. 16, 2009, pp. 1-3, XP062071748.

Mishra et al., "Exploiting Partially Overlapping Channels in Wireless Networks: Turning a Peril into an Advantage," Internet Measurement Conference Proceedings of the 5th ACM SIGCOMM, USENIX Association, 2005, pp. 311-316.

Zeng et al., "Efficient Multicast Algorithms for Multichannel Wireless Mesh Networks," IEEE Transactions on Parallel and Distributed Systems, Jan. 2010, pp. 86-99, vol. 21, Iss. 1.

International Search Report and Written Opinion—PCT/US2012/063893—ISA/EPO—Feb. 19, 2013.

\* cited by examiner

US 8,804,693 B2

REVERSE LINK THROUGHPUT MANAGEMENT FOR FLEXIBLE BANDWIDTH SYSTEMS

CROSS-RELATED APPLICATIONS

The present application for patent claims priority to Provisional Application No. 61/556,777 entitled "FRACTIONAL SYSTEMS IN WIRELESS COMMUNICATIONS" filed Nov. 7, 2011, and assigned to the assignee hereof and hereby expressly incorporated by reference herein. The present application for patent also claims priority to Provisional Application No. 61/568,742 entitled "SIGNAL CAPACITY BOOSTING, COORDINATED FORWARD LINK BLANKING AND POWER BOOSTING, AND REVERSE LINK THROUGHPUT INCREASING FOR FLEXIBLE BANDWIDTH SYSTEMS" filed Dec. 9, 2011, and assigned to the assignee hereof and hereby expressly incorporated by reference herein.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, 3GPP Long Term Evolution (LTE) systems, and orthogonal frequency-division multiple access (OFDMA) systems.

Service providers are typically allocated blocks of frequency spectrum for exclusive use in certain geographic regions. These blocks of frequencies are generally assigned by regulators regardless of the multiple access technology being used. In most cases, these blocks are not integer multiple of channel bandwidths, hence there may be unutilized parts of the spectrum. As the use of wireless devices has increased, the demand for and value of this spectrum has generally surged, as well. Nonetheless, in some cases, wireless communications systems may not utilize portions of the allocated spectrum because the portions are not big enough to fit a standard or normal waveform. The developers of the LTE standard, for example, recognized the problem and decided to support 6 different system bandwidths, namely 1.4, 3, 5, 10, 15 and 20 MHz. This may provide one partial solution to the problem. In addition, the different system bandwidths typically do not overlap, which may help avoid interference.

SUMMARY

Methods, systems, and devices for increasing reverse link throughput by coordination of multiple wireless systems using reverse link blanking are provided. Some embodiments involve utilizing the bandwidth of one carrier bandwidth that at least partially overlaps with the bandwidth of another carrier bandwidth. This overlap may create interference. Different indicators may be utilized to prompt a device, such as a mobile device, to coordinate reverse link transmission blanking on at least one of the carrier bandwidths to increase throughput for the other overlapping carrier bandwidth. For example, a base station may transmit such an indicator to the mobile device to prompt the transmission blanking. Some embodiments also include increasing transmission power for the overlapping carrier bandwidth during the transmission blanking of other carrier bandwidth. In some embodiments, the reverse link blanking occurs on a normal carrier bandwidth to facilitate increasing the reverse link throughput on a flexible carrier bandwidth that partially overlaps the normal bandwidth carrier.

Flexible carrier bandwidths systems may involve wireless communications systems that may utilize portions of spectrum that may not be big enough to fit a normal waveform utilizing flexible waveforms. A flexible carrier bandwidth system may be generated with respect to a normal carrier bandwidth system through dilating, or scaling down, the time or the chip rate of the flexible carrier bandwidth system with respect to the normal carrier bandwidth system. Some embodiments increase the bandwidth of a flexible waveform through expanding, or scaling up, the time or the chip rate of the flexible carrier bandwidth system. Flexible carrier bandwidths may also be referred to as flexible bandwidth carriers.

Some embodiments include a method of increasing reverse link throughput in a wireless communications system. The method may include: identifying a first carrier bandwidth and a second carrier bandwidth, wherein the second carrier bandwidth at least partially overlaps the first carrier bandwidth; determining an activity level on at least the first carrier bandwidth or the second carrier bandwidth; and transmitting at least a first indicator based on the determined one or more activity levels to coordinate a transmission blanking on a reverse link over the first carrier bandwidth with respect to the second carrier bandwidth.

The method of increasing reverse link throughput in a wireless communications system may include transmitting at least a second indicator based on the determined one or more activity levels to coordinate a power transmission increase on a reverse link over the second carrier bandwidth with respect to the first carrier bandwidth. Transmitting at least the first indicator based on the determined one or more activity levels to coordinate the transmission blanking on the reverse link over the first carrier bandwidth with respect to the second carrier bandwidth may include coordinating a hard transmission blanking on the reverse link over the first carrier bandwidth based on at least the first transmitted indicator. Transmitting at least the first indicator based on the determined one or more activity levels to coordinate the transmission blanking on the reverse link over the first carrier bandwidth with respect to the second carrier bandwidth may include coordinating a soft transmission blanking on the reverse link over the first carrier bandwidth based on at least the first transmitted indicator.

In some embodiments, the coordinated transmission blanking includes a transmission during a portion of the coordinated transmission blanking less than an entire period of the coordinated soft transmission blanking. Some embodiments include transitioning the coordinated soft transmission blanking to a coordinated hard transmission blanking. In some embodiments, the first carrier bandwidth is a normal carrier bandwidth and the second carrier bandwidth is a flexible carrier bandwidth. The normal carrier bandwidth may fully overlap the flexible carrier bandwidth. In some embodiments, at least the first carrier bandwidth or the second carrier bandwidth utilizes licensed spectrum. In some embodiments, the first carrier bandwidth and the second carrier bandwidth utilize different radio access technologies (RAT).

In some embodiments, the first indicator includes an indicator that is a function of at least a Reverse Activity Bit (RAB) or a RAB-like indicator. In some embodiments, the first indicator includes an indicator that is a function of at least a ReverseLinkSilenceDuration or a ReverseLinkSilenceDuration-like indicator. In some embodiments, the first indicator includes an indicator that is a function of at least a T2PInflow allocation or a T2PInflow allocation-like indicator.

The coordinated transmission blanking may include a combination of hard blanking and soft blanking. The coordinated transmission blanking over the first carrier bandwidth may occur at a slot level. Transmitting the first indicator may occur at a base station. The at least the first indicator may be transmitted to one or more mobile devices. The transmission blanking on the reverse link over the first carrier bandwidth may be coordinated to occur during a concurrent transmission over the second carrier bandwidth.

Some embodiments include coordinating an increase for at least a data rate of at least a control channel or data channel utilizing a power increase over the second carrier bandwidth. Some embodiments include coordinating a power transmission increase over the first carrier bandwidth during a period of time different than the coordinated transmission blanking over the first carrier bandwidth. Some embodiments include coordinating a concurrent transmission over the second carrier bandwidth during one or more slots when the first carrier bandwidth is not transmitting. Some embodiments include coordinating a transmission blanking on the reverse link over the second carrier bandwidth during a concurrent transmission over the first carrier bandwidth. Coordinating a transmission blanking on the reverse link over the second carrier bandwidth during the concurrent transmission over the first carrier bandwidth may depend at least upon a relative loading of the first carrier bandwidth with respect to the second carrier bandwidth or a time of day.

Some embodiments include: identifying a third carrier bandwidth different from the second carrier bandwidth, wherein the third carrier bandwidth at least partially overlaps the first carrier bandwidth; determining an activity level on at least the first carrier bandwidth or the third carrier bandwidth; and/or transmitting at least a third indicator based on the determination to a first mobile device to generate a coordinated transmission blanking on the reverse link over the first carrier bandwidth from the first mobile device responsive to the determined activity level.

Some embodiments include a wireless communications system configured for increasing reverse link throughput. The system may include: means for identifying a first carrier bandwidth and a second carrier bandwidth, wherein the second carrier bandwidth at least partially overlaps the first carrier bandwidth; means for determining an activity level on at least the first carrier bandwidth or the second carrier bandwidth; and/or means for transmitting at least a first indicator based on the determined one or more activity levels to coordinate a transmission blanking on a reverse link over the first carrier bandwidth with respect to the second carrier bandwidth.

In some embodiments, the wireless communications system includes means for transmitting at least a second indicator based on the determined one or more activity levels to coordinate a power transmission increase on a reverse link over the second carrier bandwidth with respect to the first carrier bandwidth. The wireless communications system may include means for coordinating a hard transmission blanking on the reverse link over the first carrier bandwidth based on at least the first transmitted indicator as part of transmitting at least the first indicator. The wireless communications system may include means for coordinating a soft transmission blanking on the reverse link over the first carrier bandwidth based on at least the first transmitted indicator as part of transmitting at least the first indicator.

In some embodiments, the first carrier bandwidth is a normal carrier bandwidth and the second carrier bandwidth is a flexible carrier bandwidth. In some embodiments, the first indicator includes an indicator that is a function of at least a Reverse Activity Bit (RAB) or a RAB-like indicator.

Some embodiments include a computer program product for increasing reverse link throughput in a wireless communications system. The computer program product may include a non-transitory computer-readable medium that may include: code for identifying a first carrier bandwidth and a second carrier bandwidth, wherein the second carrier bandwidth at least partially overlaps the first carrier bandwidth; code for determining an activity level on at least the first carrier bandwidth or the second carrier bandwidth; and/or code for transmitting at least a first indicator based on the determined one or more activity levels to coordinate a transmission blanking on a reverse link over the first carrier bandwidth with respect to the second carrier bandwidth.

The non-transitory computer-readable medium may include code for transmitting at least a second indicator based on the determined one or more activity levels to coordinate a power transmission increase on a reverse link over the second carrier bandwidth with respect to the first carrier bandwidth. The non-transitory computer-readable medium may include code for coordinating a hard transmission blanking on the reverse link over the first carrier bandwidth based on at least the first transmitted indicator as part of transmitting at least the first indicator. The non-transitory computer-readable medium may include code for coordinating a soft transmission blanking on the reverse link over the first carrier bandwidth based on at least the first transmitted indicator as part of transmitting at least the first indicator. In some embodiments, the first carrier bandwidth is a normal carrier bandwidth and the second carrier bandwidth is a flexible carrier bandwidth. In some embodiments, the first indicator comprises an indicator that is a function of at least a ReverseLinkSilenceDuration or a ReverseLinkSilenceDuration-like indicator.

Some embodiments include a wireless communications device configured for increasing reverse link throughput. The device may include at least one processor configured to: identify a first carrier bandwidth and a second carrier bandwidth, wherein the second carrier bandwidth at least partially overlaps the first carrier bandwidth; determine an activity level on at least the first carrier bandwidth or the second carrier bandwidth; and/or transmit at least a first indicator based on the determined one or more activity levels to coordinate a transmission blanking on a reverse link over the first carrier bandwidth with respect to the second carrier bandwidth. The device may also include at least one memory coupled with the at least one processor.

In some embodiments, the at least one processor is further configured to transmit at least a second indicator based on the determined one or more activity levels to coordinate a power transmission increase on a reverse link over the second carrier bandwidth with respect to the first carrier bandwidth. The at least one processor may be further configured to coordinate a hard transmission blanking on the reverse link over the first carrier bandwidth based on at least the first transmitted indicator as part of transmitting at least the first indicator. The at least one processor may be further configured to coordinate a soft transmission blanking on the reverse link over the first carrier bandwidth based on at least the first transmitted indicator as part of transmitting at least the first indicator. In some embodiments, the first carrier bandwidth is a normal carrier bandwidth and the second carrier bandwidth is a flexible carrier bandwidth. In some embodiments, the first indicator includes an indicator that is a function of at least a T2PInflow allocation or a T2PInflow allocation-like indicator.

Some embodiments include a method of increasing reverse link throughput in a wireless communications system. The method may include: receiving at least a first indicator for coordinating a transmission blanking on a reverse link over a first carrier bandwidth; and/or utilizing at least the first received indicator to coordinate the transmission blanking on the reverse link over the first carrier bandwidth during a concurrent transmission over a second carrier bandwidth that at least partially overlaps the first carrier bandwidth.

In some embodiments, utilizing at least the first received indicator to coordinate the transmission blanking on the reverse link over the first carrier bandwidth during the concurrent transmission over the second carrier bandwidth that partially overlaps the first carrier bandwidth the transmission blanking includes performing a hard transmission blanking on the reverse link over the first carrier bandwidth utilizing at least the first received indicator. Utilizing at least the first received indicator to coordinate the transmission blanking on the reverse link over the first carrier bandwidth during the concurrent transmission over the second carrier bandwidth that partially overlaps the first carrier bandwidth the transmission blanking may include performing a soft transmission blanking on the reverse link over the first carrier bandwidth utilizing at least the first received indicator. In some embodiments, the transmission blanking includes a combination of hard blanking and soft blanking. In some embodiments, receiving at least the first indicator occurs at a mobile device.

In some embodiments, the first carrier bandwidth is a normal carrier bandwidth and the second carrier bandwidth is a flexible carrier bandwidth. The first indicator may include an indicator that is a function of at least a Reverse Activity Bit (RAB) or a RAB-like indicator. The first indicator may include an indicator that is a function of at least a ReverseLinkSilenceDuration or a ReverseLinkSilenceDuration-like indicator. The first indicator may include an indicator that is a function of at least a T2PInflow allocation or a T2PInflow allocation-like indicator.

Some embodiments include increasing a power of transmission over the second carrier bandwidth for the concurrent transmission during the coordinated transmission blanking over the first carrier bandwidth. Some embodiments include utilizing at least the first indicator or a second indicator to create a coordinated transmission blanking on the reverse link over the first carrier bandwidth during a concurrent transmission over a third carrier bandwidth that partially overlaps the first carrier bandwidth.

Some embodiments include a wireless communications system configured for increasing reverse link throughput. The system may include: means for receiving at least a first indicator for coordinating a transmission blanking on a reverse link over a first carrier bandwidth; and/or means for utilizing at least the first received indicator to coordinate the transmission blanking on the reverse link over the first carrier bandwidth during a concurrent transmission over a second carrier bandwidth that at least partially overlaps the first carrier bandwidth.

The wireless communications system may include means for performing a hard transmission blanking on the reverse link over the first carrier bandwidth as part of utilizing at least the first received indicator. The wireless communications system may include means for performing a soft transmission blanking on the reverse link over the first carrier bandwidth as part of utilizing at least the first received indicator.

In some embodiments, the first carrier bandwidth is a normal carrier bandwidth and the second carrier bandwidth is a flexible carrier bandwidth. In some embodiments, the first indicator includes an indicator that is a function of at least a Reverse Activity Bit (RAB) or a RAB-like indicator.

Some embodiments include a computer program product for increasing reverse link throughput in a wireless communications system that may include a non-transitory computer-readable medium that may include: code for receiving at least a first indicator for coordinating a transmission blanking on a reverse link over a first carrier bandwidth; and/or code for utilizing at least the first received indicator to coordinate the transmission blanking on the reverse link over the first carrier bandwidth during a concurrent transmission over a second carrier bandwidth that at least partially overlaps the first carrier bandwidth.

The non-transitory computer-readable medium may include code for performing a hard transmission blanking on the reverse link over the first carrier bandwidth as part of utilizing at least the first received indicator. The non-transitory computer-readable medium may include code for performing a soft transmission blanking on the reverse link over the first carrier bandwidth as part of utilizing at least the first received indicator.

In some embodiments, the first carrier bandwidth is a normal carrier bandwidth and the second carrier bandwidth is a flexible carrier bandwidth. In some embodiments, the first indicator includes an indicator that is a function of at least a ReverseLinkSilenceDuration or a ReverseLinkSilenceDuration-like indicator.

Some embodiments include a wireless communications device configured for increasing reverse link throughput. The device may include at least one processor that may be configured to: receive at least a first indicator for coordinating a transmission blanking on a reverse link over a first carrier bandwidth; and/or utilize at least the first received indicator to coordinate the transmission blanking on the reverse link over the first carrier bandwidth during a concurrent transmission over a second carrier bandwidth that at least partially overlaps the first carrier bandwidth. The device may include at least one memory coupled with the at least one processor.

The at least one processor may be configured to perform a hard transmission blanking on the reverse link over the first carrier bandwidth as part of utilizing at least the first received indicator. The at least one processor may be configured to perform a soft transmission blanking on the reverse link over the first carrier bandwidth as part of utilizing at least the first received indicator. In some embodiments, the first carrier bandwidth is a normal carrier bandwidth and the second carrier bandwidth is a flexible carrier bandwidth. In some embodiments, the first indicator includes an indicator that is a function of at least a T2PInflow allocation or a T2PInflow allocation-like indicator.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
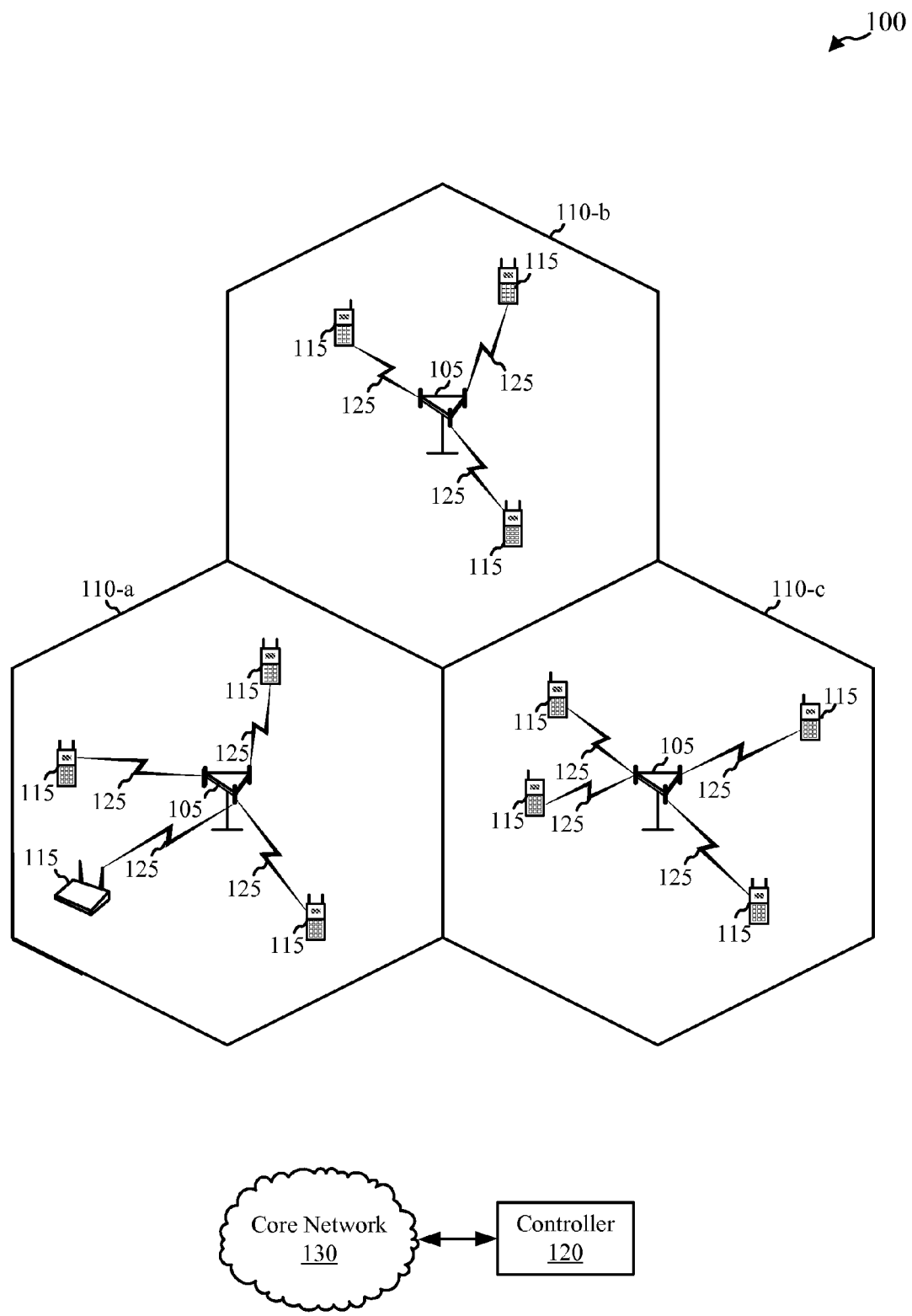
FIG. 1 shows a block diagram of a wireless communications system in accordance with various embodiments.

Methods, systems, and devices for increasing reverse link throughput by coordination of multiple wireless systems using reverse link blanking are provided. Some embodiments involve utilizing the bandwidth of one carrier bandwidth that at least partially overlaps with the bandwidth of another carrier bandwidth. This overlap may create interference. Different indicators may be utilized to prompt a device, such as a mobile device, to coordinate reverse link transmission blanking on at least one of the carrier bandwidths to increase throughput for the other overlapping carrier bandwidth. For example, a base station may transmit such a indicator to the mobile device to prompt the transmission blanking. Some embodiments also include increasing transmission power for the overlapping carrier bandwidth during the transmission blanking of other carrier bandwidth. In some embodiments, the reverse link blanking occurs on a normal carrier bandwidth to facilitate increasing the reverse link throughput on a flexible carrier bandwidth that at least partially overlaps the normal bandwidth carrier.

Some embodiments may utilize hard blanking and/or soft blanking. For example, some embodiments may utilize hard blanking in one system where no data is scheduled for one or more slots in that system. In some cases, pilot and MAC transmission may still happen in those slots as in empty slots. Soft blanking may include situations where a base station, for example, may not be completely silent in the data portion of the slots but where the base station may transmit less than what the base station would have in the absence of soft blanking, for example. Soft blanking may include transmissions of at least a priority flow or a delay sensitive flow over at least a portion of the blanking duration, for example. Soft blanking may include reducing a power of transmission. Soft blanking may include reducing power of certain channels.

Flexible carrier bandwidths systems may involve wireless communications systems that may utilize portions of spectrum that may not be big enough to fit a normal waveform utilizing flexible waveforms. A flexible carrier bandwidth system may be generated with respect to a normal carrier bandwidth system through dilating, or scaling down, the time or the chip rate of the flexible carrier bandwidth system with respect to the normal carrier bandwidth system. Some embodiments increase the bandwidth of a flexible waveform through expanding, or scaling up, the time or the chip rate of the flexible bandwidth system.

Techniques described herein may be used for various wireless communications systems such as CDMA, TDMA, FDMA, OFDMA, SC-FDMA, Peer-to-Peer, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA or OFDM system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100 in accordance with various embodiments. The system 100 includes base stations 105, mobile devices 115, a base station controller 120, and a core network 130 (the controller 120 may be integrated into the core network 130 in some embodiments; in some embodiments, controller 120 may be integrated into base stations 105). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, Time Division Multiple Access (TDMA) signal, Frequency Division Multiple Access (FDMA) signal, Orthogonal FDMA (OFDMA) signal, Single-Carrier FDMA (SC-FDMA) signal, etc. Each modulated signal may be sent on a different carrier and may carry control information (e.g., pilot signals), overhead information, data, etc. The system 100 may be a multi-carrier LTE network capable of efficiently allocating network resources.

The mobile devices 115 may be any type of mobile station, mobile device, access terminal, subscriber unit, or user equipment. The mobile devices 115 may include cellular phones and wireless communications devices, but may also include personal digital assistants (PDAs), smartphones, other handheld devices, netbooks, notebook computers, etc. Thus, the term mobile device should be interpreted broadly hereinafter, including the claims, to include any type of wireless or mobile communications device.

The base stations 105 may wirelessly communicate with the mobile devices 115 via a base station antenna. The base stations 105 may be configured to communicate with the mobile devices 115 under the control of the controller 120 via multiple carriers. Each of the base station 105 sites can provide communication coverage for a respective geographic area. In some embodiments, base stations 105 may be referred to as a NodeB, eNodeB, Home NodeB, and/or Home eNodeB. The coverage area for each base station 105 here is identified as 110-a, 110-b, or 110-c. The coverage area for a base station may be divided into sectors (not shown, but making up only a portion of the coverage area). The system 100 may include base stations 105 of different types (e.g., macro, micro, femto, and/or pico base stations).

The different aspects of system 100, such as the mobile devices 115, the base stations 105, the core network 130, and/or the controller 120 may be configured to utilize flexible bandwidth and waveforms in accordance with various embodiments. System 100, for example, shows transmissions 125 between mobile devices 115 and base stations 105. The transmissions 125 may include uplink and/or reverse link transmission, from a mobile device 115 to a base station 105, and/or downlink and/or forward link transmissions, from a base station 105 to a mobile device 115. The transmissions 125 may include flexible and/or normal waveforms. Normal waveforms may also be referred to as legacy and/or normal waveforms.

The different aspects of system 100, such as the mobile devices 115, the base stations 105, the core network 130, and/or the controller 120 may be configured to utilize flexible bandwidth and waveforms in accordance with various embodiments. For example, different aspects of system 100 may utilize portions of spectrum that may not be big enough to fit a normal waveform. Devices such as the mobile devices 115, the base stations 105, the core network 130, and/or the controller 120 may be configured to adapt the chip rates and/or scaling factors to generate and/or utilize flexible bandwidth and/or waveforms. Some aspects of system 100 may form a flexible subsystem (such as certain mobile devices 115 and/or base stations 105) that may be generated with respect to a normal subsystem (that may be implemented using other mobile devices 115 and/or base stations 105) through dilating, or scaling down, the time of the flexible subsystem with respect to the time of the normal subsystem.

In some embodiments, the different aspects of system 100, such as the mobile devices 115, the base stations 105, the core network 130, and/or the controller 120 may be configured for increasing reverse link throughput by coordination of multiple wireless systems using reverse link blanking. As mentioned above, the bandwidth of a flexible waveform may overlap with the bandwidth of a normal waveform. Base stations 105 and/or mobile devices 115 may utilize different indicators to prompt a device, such as a mobile device 115, to utilize reverse link blanking on a normal bandwidth system to increase throughput for an overlapping flexible bandwidth system. In some embodiments, reverse link blanking may also occur on a flexible bandwidth system. Some embodiments may also utilize power boosting on the reverse link to increase reverse link throughput, such as on the flexible bandwidth system.

Some embodiments may include mobile devices and/or base stations that may generate flexible waveforms and/or normal waveforms. Flexible waveforms may occupy less bandwidth than a normal waveform. For example, at a band edge, there may not be enough available spectrum to place a normal waveform. For a flexible waveform in some embodiments, as time gets dilated, the frequency occupied by a waveform goes down, thus making it possible to fit a flexible waveform into spectrum that may not be broad enough to fit a normal waveform. Flexible waveforms may also be generated in some embodiments through using a scaling factor. Other embodiments may generate a flexible waveform to fit a portion of spectrum through altering a rate or chip rate (e.g., a spreading factor may change). Some embodiments may change a frequency of processing to change a chip rate or utilize a scaling factor. Changing frequency of processing may include changing an interpolation rate, an interrupt rate, and/or a decimation rate. In some embodiments, a chip rate may be changed or a scaling factor utilized through filtering, by decimation, and/or by changing a frequency of an ADC, a DAC, and/or an offline clock. A divider may be used to change the frequency of at least one clock.

In some embodiments, a flexible system or waveform may be a fractional system or waveform. Fractional systems and/or waveforms may or may not change bandwidth for example. A fractional system or waveform may be flexible because it may offer more possibilities than a normal system or waveform (e.g., N=1 system). A normal system or waveform may refer to a standard and/or legacy system or waveform.

Figure 2A:
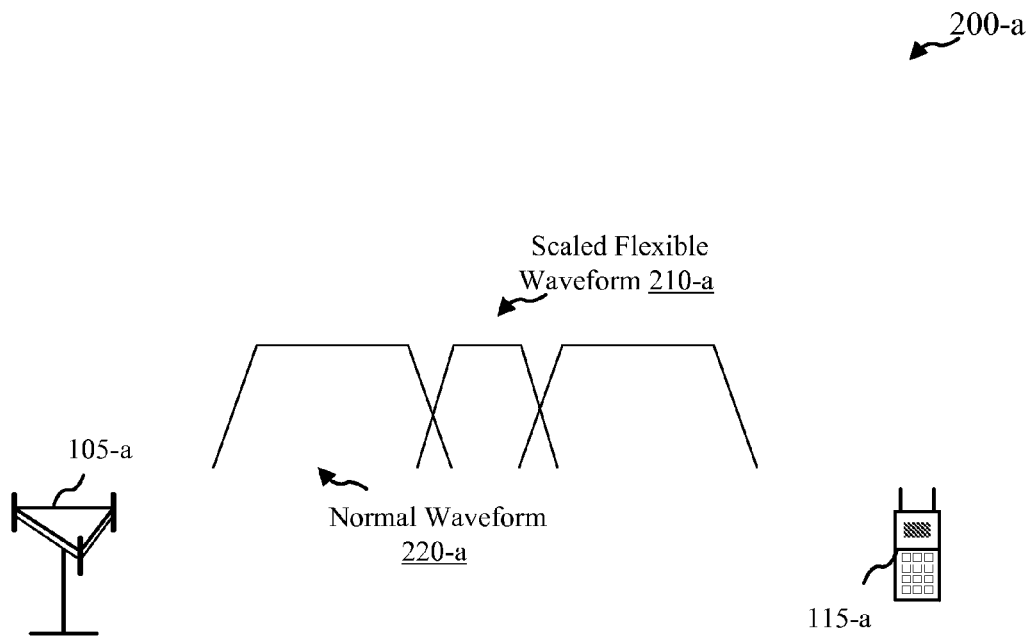
FIG. 2A shows an example of a wireless communications system where a flexible waveform fits into a portion of spectrum not broad enough to fit a normal waveform in accordance with various embodiments.

FIG. 2A shows an example of a wireless communications system 200-a with a base station 105-a and a mobile device 115-a in accordance with various embodiments, where a flexible waveform 210-a fits into a portion of spectrum not broad enough to fit a normal waveform 220-a. System 200-a may be an example of system 100 of FIG. 1. In some embodiments, the flexible waveform 210-a may overlap with the normal waveform 220-a that either the base 105-a and/or the mobile device 115-a may transmit. In some cases, the normal waveform 220-a may completely overlap the flexible waveform 210-a. Some embodiments may also utilize multiple flexible waveforms 210. In some embodiments, another base station and/or mobile device (not shown) may transmit the normal waveform 220-a and/or the flexible waveform 210-a.

Figure 2B:
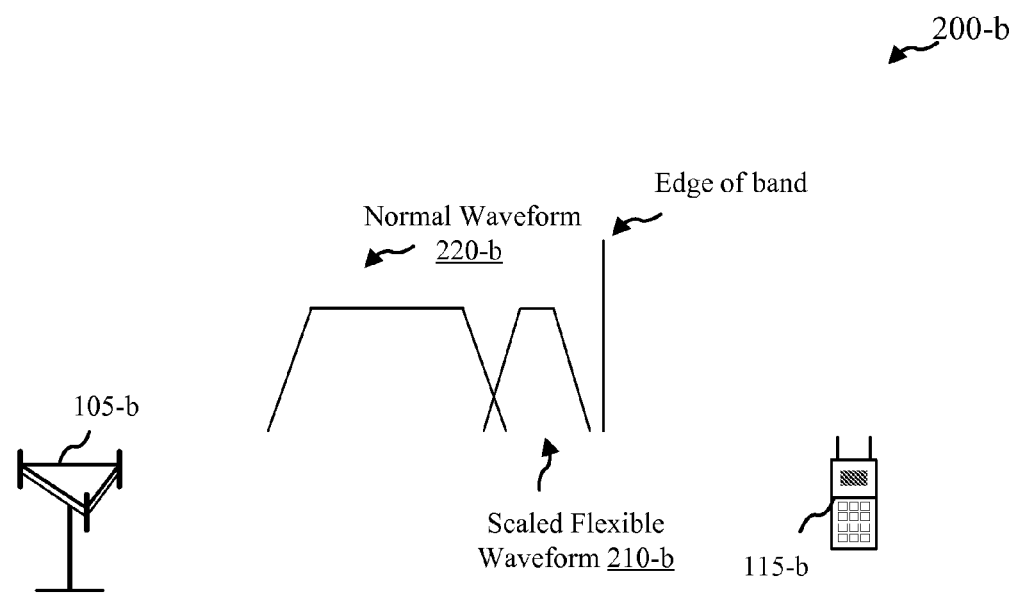
FIG. 2B shows an example of a wireless communications system where a flexible waveform fits into a portion of spectrum near an edge of a band in accordance with various embodiments.

In some embodiments, the mobile device 115-a and/or the base station 105-a may be configured to separate the signaling and the data traffic into different flexible bandwidth carriers 210 so that assigned resources can be customized to different traffic patterns. The base station 105-a may be configured to coordinate forward link blanking and/or power boosting with respect to the normal waveform 220-a and/or flexible waveform 210-a. For example, transmissions between mobile device 115-a and base station 105-a may utilize bandwidth of the flexible waveform 210-a that may overlap with the bandwidth of the normal waveform 220-a. In some embodiments, the mobile device 115-a and/or base station 105-a may be configured for increasing reverse link throughput by coordination of multiple wireless systems using reverse link blanking. Base stations 105-a may utilize different indicators to prompt a device, such as a mobile device 115-a, to utilize reverse link blanking on a normal waveform 220-a to increase throughput for an overlapping flexible waveform 210-a. In some embodiments, reverse link blanking may also occur on a flexible waveform 210-a. Some embodiments may also utilize power boosting on the reverse link to increase reverse link throughput, such as on the flexible waveform 210-a. FIG. 2B shows an example of a wireless communications system 200-b with a base station 105-b and mobile device 115-b, where a flexible waveform 210-b fits into a portion of spectrum near an edge of a band, which may be a guard band, where normal waveform 220-b may not fit. System 200-b may be an example of system 100 of FIG. 1.

Figure 2C:
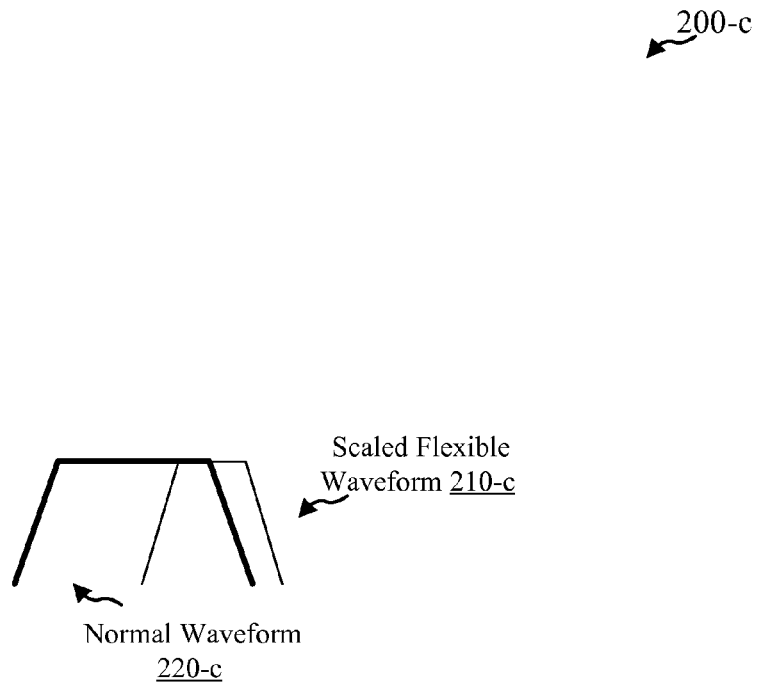
FIG. 2C shows an example of a wireless communications system where a flexible waveform partially overlaps a normal waveform in accordance with various embodiments.
Figure 2D:
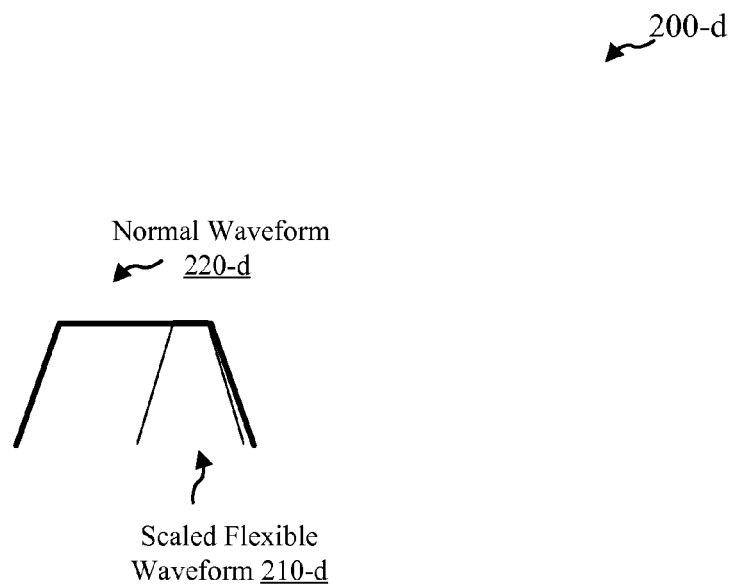
FIG. 2D shows an example of a wireless communications system where a flexible waveform is completely overlapped by a normal waveform in accordance with various embodiments.
Figure 2E:
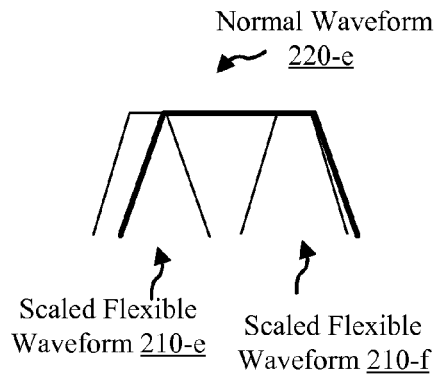
FIG. 2E shows an example of a wireless communications system where one flexible waveform is completely overlapped by a normal waveform and another flexible waveform partially overlaps a normal waveform in accordance with various embodiments.
Figure 2F:
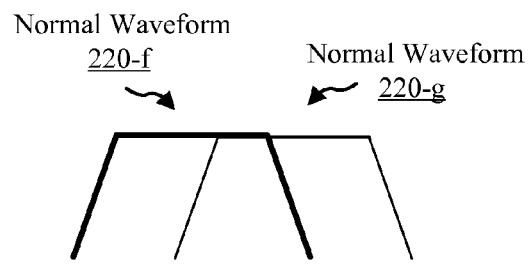
FIG. 2F shows an example of a wireless communications system where one normal waveform partially overlaps another normal waveform in accordance with various embodiments.

FIG. 2C shows an example of a wireless communications system 200-c where a flexible waveform 210-c partially overlaps a normal waveform 220-c in accordance with various embodiments. System 200-c may be an example of system 100 of FIG. 1. FIG. 2D shows an example of a wireless communications systems 200-d where a flexible waveform 210-d is completely overlapped by a normal waveform 220-d in accordance with various embodiments. System 200-d may be an example of system 100 of FIG. 1. FIG. 2E shows an example of a wireless communications system 200-e where one flexible waveform 210-f is completely overlapped by a normal waveform 220-e and another flexible waveform 210-e partially overlaps the normal waveform 220-e in accordance with various embodiments. System 200-e may be an example of system 100 of FIG. 1. FIG. 2F shows an example of a wireless communications system 200-f where one normal waveform 220-f partially overlaps another normal waveform 220-g in accordance with various embodiments. System 200-f may be an example of system 100 of FIG. 1.

In general, a first waveform or carrier bandwidth and a second waveform or carrier bandwidth may partially overlap when they overlap by at least 1%, 2%, and/or 5%. In some embodiments, partial overlap may occur when the overlap is at least 10%. In some embodiments, the partial overlap may be less than 99%, 98%, and/or 95%. In some embodiments, the overlap may be less than 90%. In some cases, a flexible waveform or carrier bandwidth may be contained completely within another waveform or carrier bandwidth such as seen in system 200-d of FIG. 2. This overlap still reflects partial overlap, as the two waveforms or carrier bandwidths do not completely coincide. In general, partial overlap can mean that the two or more waveforms or carrier bandwidths do not completely coincide (i.e., the carrier bandwidths are not the same).

Some embodiments may utilize different definitions of overlap based on power spectrum density (PSD). For example, one definition of overlap based on PSD is shown in the following overlap equation for a first carrier:

$$\text{overlap} = 100\% * \frac{\int_0^\infty PSD_1(f) * PSD_2(f)}{\int_0^\infty PSD_1(f) * PSD_1(f)}.$$

In this equation, $PSD_1(f)$ is the PSD for a first waveform or carrier bandwidth and $PSD_2(f)$ is the PSD for a second waveform or carrier bandwidth. When the two waveforms or carrier bandwidths coincide, then the overlap equation may equal 100%. When the first waveform or carrier bandwidth and the second waveform or carrier bandwidth at least partially overlap, then the overlap equation may not equal 100%. For example, the Overlap Equation may result in a partial overlap of greater than or equal to 1%, 2%, 5%, and/or 10% in some embodiments. The overlap equation may result in a partial overlap of less than or equal to 99%, 98%, 95%, and/or 90% in some embodiments. One may note that in the case in which the first waveform or carrier bandwidth is a normal waveform or carrier bandwidth and the second waveform or a carrier waveform is a flexible waveform or carrier bandwidth that is contained within the normal bandwidth or carrier bandwidth, then the overlap equation may represent the ratio of the flexible bandwidth compared to the normal bandwidth, written as a percentage. Furthermore, the overlap equation may depend on which carrier bandwidth's perspective the overlap equation is formulated with respect to. Some embodiments may utilize other definitions of overlap. In some cases, another overlap may be defined utilizing a square root operation such as the following:

$$\text{overlap} = 100\% * \sqrt{\frac{\int_0^\infty PSD_1(f) * PSD_2(f)}{\int_0^\infty PSD_1(f) * PSD_1(f)}}.$$

Other embodiments may utilize other overlap equations that may account for multiple overlapping carriers.

Figure 3:
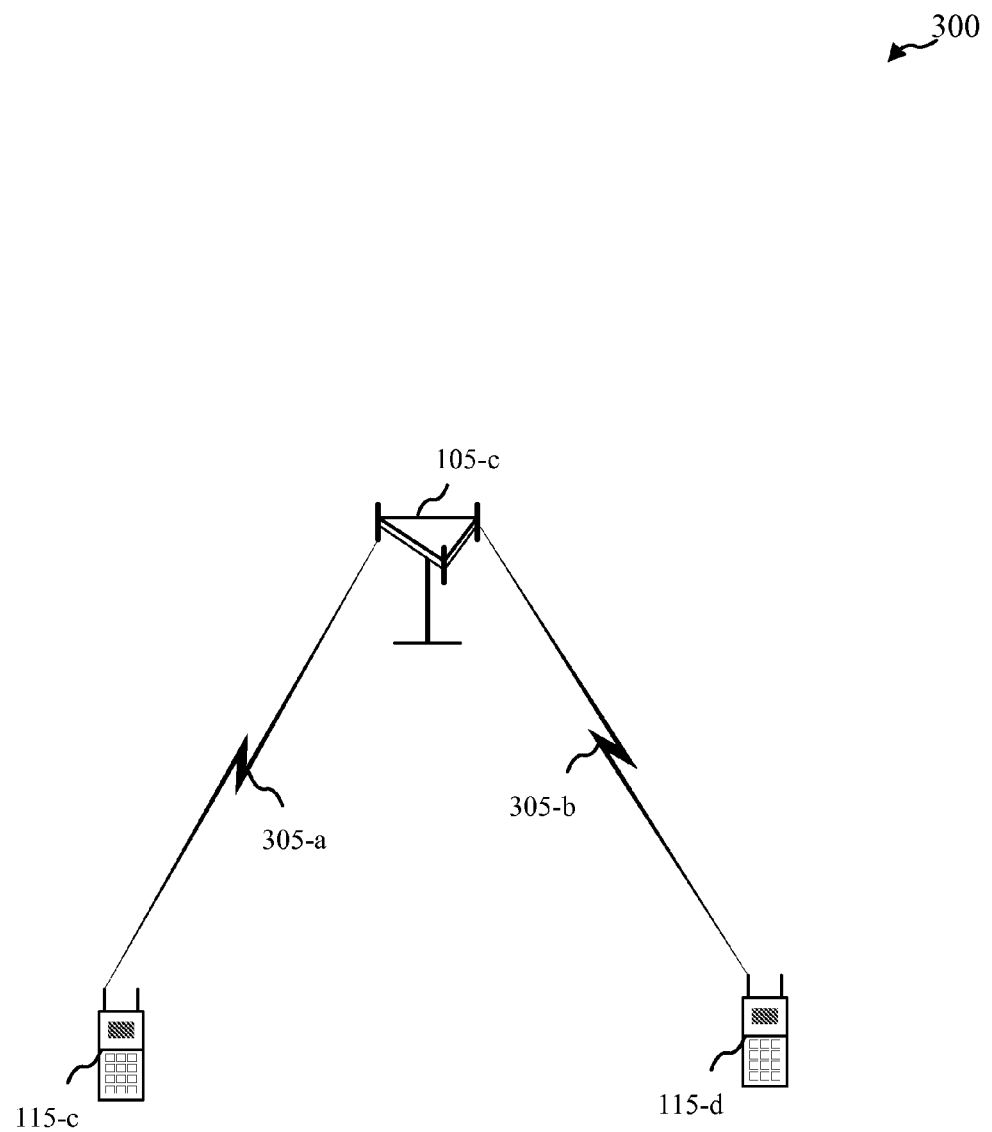
FIG. 3 shows a block diagram of a wireless communications system in accordance with various embodiments.

FIG. 3 shows a wireless communications system 300 with a base station 105-*c* and mobile devices 115-*c* and 115 *d*, in accordance with various embodiments. In some embodiments, the base station 105-*c* may be configured for coordinating forward link blanking and/or power boosting in normal and/or flexible carrier bandwidths. For example, transmissions 305-*a* and/or 305-*b* between the mobile device 115-*c*/115-*d* and the base station 105-*c* may utilize bandwidth of a flexible waveform that may overlap with the bandwidth of a normal waveform; other configurations are possible, such as partially overlapping normal waveforms or partially overlapping flexible waveforms. The base station 105-*c* may coordinate reduce link blanking and/or power boosting that may aid in reducing the impact of interference. In some embodiments, the base station 105-*c* may coordinate with one or more of the mobile devices 115-*c*/115-*d* to coordinate reverse link blanking and/or power boosting in a normal and/or flexible carrier bandwidths. For example, the base station 105-*c* may be configured to identify multiple bandwidth carriers, such as first carrier bandwidth and a second carrier bandwidth. The second carrier bandwidth may partially overlap the first carrier bandwidth. The base station 105-*c* may determine an activity level on at least the first carrier bandwidth or the second carrier bandwidth. Based on that determination, the base station 105-*c* may transmit an indicator, such as a first indicator, to at least one of the mobile devices 115-*c*/115-*d* to generate a transmission blanking on a reverse link over the first carrier bandwidth from at least one of the mobile devices 115-*c*/115-*d* responsive to the determined activity level. In some embodiments, the base station 105-*c* transmitting at least a first indicator based on the determined one or more activity levels may be used to coordinate a transmission blanking on a reverse link over the first carrier bandwidth with respect to the second carrier bandwidth. In some embodiments, the base station 105-*c* may coordinate the transmission blanking on the reverse link over the first carrier bandwidth such that the blanking occurs during a concurrent transmission over the second carrier bandwidth. In some embodiments, the base station 105-*c* coordinates a transmission power increase over the second carrier bandwidth during the transmission blanking over the first carrier bandwidth. For example, the base station 105-*c* may coordinate reverse link power boosting by transmitting at least a second indicator based on the determined one or more activity levels to coordinate a power transmission increase on a reverse link over the second carrier bandwidth with respect to the first carrier bandwidth. The power transmission increase may occur at one of the mobile devices 115-*c*/115-*d* that may be transmitting over the second carrier bandwidth.

Transmissions 305-*a* and/or 305-*b* between the mobile device 115-*c*/115-*d* and the base station 105-*c* may utilize flexible waveforms that may be generated to occupy less (or more) bandwidth than a normal waveform. For example, at a band edge, there may not be enough available spectrum to place a normal waveform. For a flexible waveform, as time gets dilated, the frequency occupied by a waveform goes down, thus making it possible to fit a flexible waveform into spectrum that may not be broad enough to fit a normal waveform. In some embodiments, the flexible waveform may be scaled utilizing a scaling factor N with respect to a normal waveform. Scaling factor N may take on numerous different values including, but not limited to, integer values such as 1, 2, 3, 4, 8, etc. N, however, does not have to be an integer.

Some embodiments may utilize additional terminology. A new unit D may be utilized. The unit D is dilated. The unit is unitless and has the value of N. One can talk about time in the flexible system in terms of "dilated time". For example, a slot of say 10 ms in normal time may be represented as 10 Dms in flexible time (note: even in normal time, this will hold true since N=1 in normal time: D has a value of 1, so 10 Dms=10 ms). In time scaling, one can replace most "seconds" with "dilated-seconds". Note frequency in Hertz is 1/s.

As discussed above, a flexible waveform may be a waveform that occupies less bandwidth than a normal waveform. Thus, in a flexible bandwidth system, the same number of symbols and bits may be transmitted over a longer duration compared to a normal bandwidth system. This may result in time stretching, whereby slot duration, frame duration, etc., may increase by a scaling factor N. Scaling factor N may represent the ratio of the normal bandwidth to flexible bandwidth (BW). Thus, data rate in a flexible bandwidth system may equal (Normal Rater 1/N), and delay may equal (Normal Delay×N). In general, a flexible systems channel BW=channel BW of normal systems/N. Delay×BW may remain unchanged. Furthermore, in some embodiments, a flexible waveform may be a waveform that occupies more bandwidth than a normal waveform.

Throughout this specification, the term normal system, subsystem, and/or waveform may be utilized to refer to systems, subsystems, and/or waveforms that involve embodiments that may utilize a scaling factor that may be equal to one (e.g., N=1) or a normal or standard chip rate. These normal systems, subsystems, and/or waveforms may also be referred to as standard and/or legacy systems, subsystems, and/or waveforms. Furthermore, flexible systems, subsystems, and/or waveforms may be utilized to refer to systems, subsystems, and/or waveforms that involve embodiments that may utilize a scaling factor that may be not equal to one (e.g., N=2, 3, 4, 8, ½, ¼, etc.). For N>1, or if a chip rate is decreased, the bandwidth of a waveform may decrease. Some embodiments may utilize scaling factors or chip rates that increase the bandwidth. For example, if N<1, or if the chip rate is increased, then a waveform may be expanded to cover bandwidth larger than a normal waveform. Flexible systems, subsystems, and/or waveforms may also be referred to as fractional systems, subsystems, and/or waveforms in some cases. Fractional systems, subsystems, and/or waveforms may or may not change bandwidth, for example. A fractional system, subsystem, or waveform may be flexible because it may offer more possibilities than a normal or standard system, subsystem, or waveform (e.g., N=1 system). A flexible system, subsystem, bandwidth, and/or waveform may also be referred to as a flexible bandwidth system, subsystem, bandwidth, and/or waveform. A flexible system, subsystem, bandwidth, and/or waveform may also be referred to as a flexible carrier bandwidth system, subsystem, and/or waveform or a flexible bandwidth carrier system subsystem, and/or waveform. A flexible bandwidth carrier may be referred to as a flexible carrier bandwidth.

A flexible waveform may include a waveform that occupies less bandwidth than a normal waveform (in some embodiments, a flexible waveform may include a waveform that occupies more bandwidth than a normal waveform). For example, at the band edge, there may not be enough available spectrum to place a normal waveform. Unlike normal waveforms, there can be partial or complete overlap between normal and flexible waveforms. It is to be noted that the flexible waveform may increase the system capacity. There can be a trade off between extent of overlap and the bandwidth of the flexible waveform. The overlap may create additional interference. Embodiments may be directed at methods, systems, and/or devices and be aimed at reducing the interference.

Some embodiments include methods, systems, and/or devices for increasing reverse link throughput by coordination of multiple wireless systems using reverse link blanking. As mentioned above, the bandwidth of a flexible waveform may overlap with the bandwidth of a normal waveform. This overlap may create additional interference. Different indicators may be utilized to prompt a device, such as a mobile device, to utilize reverse link blanking on a normal bandwidth system to increase throughput for an overlapping flexible bandwidth system.

Reverse link blanking may help mitigate interference for completely overlapping or partially overlapping normal and flexible (or different flexible or for different normal) bandwidth systems. For example, embodiments may involve two or more wireless systems that partially or fully overlap in frequency domain such as flexible 2/3/4G waveform partially or fully overlapping with the full or flexible 2/3/4G waveform. Another example is that two or more full 3G waveforms are partially overlapping (e.g., two UMTS carriers separated with less than 5 MHz or two C2K carriers separated with less than 1.25 MHz). In these cases, these carriers may interfere with each other. Therefore, the performances of these systems may degrade. Embodiments provide methods, systems, and/or devices that may handle this performance degradation.

Some embodiments may utilize existing silencing mechanisms that may be designed for other purposes. For example, silencing may exist to measure background noise, rise over thermal (ROT), etc. Some embodiments may utilize ReverseLinkSilenceDuration for reverse link blanking. ReverseLinkSilenceDuration generally specifies the length of the Silence Interval (in units of frames) during which a mobile device may not be allowed to transmit on a reverse link (RL). Traditionally, the Silence Interval may be used by the base station to more accurately measure and calibrate ROT (rise over thermal), which is an indicator of system loading and a measure of interference seen by each mobile device. For example, RL MAC algorithms may use the ROT measurement to better control the allocation of RL resources. As an example, RL MAC uses the ROT measurement to determine the Reverse Activity Bit (RAB) value. In some cases, the allowed ranges may be from 0 to 3 units of frames.

Some embodiments may utilize tools and techniques similar to ReverseLinkSilencePeriod for reverse link blanking. ReverseLinkSilencePeriod can specify the period of the Reverse Link Silence Interval. The allowed values may include 54, 109, 218, and 437 seconds. Some embodiments may generate reverse link blanking through utilizing tools and techniques similar to Reverse Activity Bit (RAB) that may be received every slot. It may be used to indicate to the mobile devices the activity of the UL so that the mobile devices may estimate how much power they can put out without putting the cell into an unstable interference point. Some embodiments may generate reverse link blanking through utilizing tools and techniques similar to Quick Reverse Activity Bit (QRAB) that may provide an average of the RAB taken over the short term (e.g., 4 slots) and used to determine if T2PInflow allocation should be increased. Some embodiments may generate reverse link blanking through utilizing tools and techniques similar to Filtered Reverse Activity Bit (FRAB) that may provide an average of the RAB taken over the long term (384 slots) and may be used to determine the T2P that can be allocated to a given MAC flow. FRAB may be represented by a real number between −1 and 1 for a given sector indicating load level (−1=unloaded, 0=loaded, 1=heavily loaded). FRAB may be calculated per mobile device and may be the same for all flows.

Some embodiments may generate reverse link blanking through utilizing T2Pinflow allocation. For example, mobile device power allocation for different flows may depend on the T2P allocation as each MAC flow originates with a different set of QoS requirements. Hence T2PInflow resource allocations can be different for different flows. As sector loading increases, T2PInflow allocation can decrease in order of priority of the flow; for example delay-sensitive low rate flows (VoIP) can be the last to be affected. Thus, T2PInflow allocation can take care of intra-mobile device QoS.

Some embodiments may utilize tools and techniques similar to ReverseLinkSilenceDuration to create hard blanking on RL rather than for ROT measurement. Consider a situation involving a normal system and one or more flexible systems. There can be partial overlap between the two or in the extreme complete overlap of flexible with normal. During high loading in 1st system (in RL) and if the 2nd system is not highly loaded, some embodiments may utilize tools and techniques similar to ReverseLinkSilenceDuration to create gaps in RL transmission of $2^{nd}$ system. This may help the flexible RL by blanking on the normal RL even when normal sector is not overloaded and vice versa. The use of RL blanking may clear up spectrum to get more throughput or less error. In some embodiments, if the loading on any system exceeds a threshold, then normal mechanisms for overload control (e.g., setting RAB bits and reducing T2Pinflow allocation etc.) may be utilized.

In some embodiments, if ReverseLinkSilenceDuration is set too high (this may be the case when normal and high N flexible co-exist for example), then it may prevent access attempts and reverse traffic user data from being sent during those times, resulting in decreases in Reverse Link throughput and increased access time. The ReverseLinkSilenceDuration may be set taking into consideration the QoS requirements of the existing flows. For example, instead of making the ReverseLinkSilenceDuration higher, the ReverseLinkSilencePeriod can be made smaller resulting in gaps of less duration but gaps being created more frequently.

To take advantage of the silence period of the first system, the second system may start setting the RAB earlier. In some embodiments, the upcoming silence of the first system may be broadcast in the second system. The current ReverseLinkSilencePeriod and Reverse Link Silence Interval ranges may not be sufficient for RL blanking in accordance with various embodiments. Silence Interval ranges may thus be expanded in some embodiments.

Some embodiments may utilize soft blanking on the reverse link. For example, the current system and other system may be viewed as a combined entity and scheduling can be done over both systems (more than two systems, over all systems). Typically, systems and/or schedulers may optimize for terminals on one specific carrier. For soft blanking, the RAB may be set and mobile devices may think there is a lot of activity going on in UL. With increases in system loading (RAB is indicating that to mobile devices), T2PInflow allocation for mobile devices may decrease in order of priority of the flow. This kind of soft blanking may involve the mobile devices not being completely silent, as in hard blanking, but they are transmitting less than what they would have in an unloaded system (as the system is under the assumption).

For example, for soft blanking on RL, if a first mobile device has FTP and VoIP flows, it may have allocation for VoIP flow only while a second mobile device having only FTP flow may have allocation for FTP flow. This can hold true for transition from hard blanking (when a mobile device does not have any allocation for any flow) to soft blanking also. Then gradually, the first mobile device may start having allocation for its FTP flow and the second mobile device can have more allocation for its FTP flow.

The performance of the other system during the soft blanking duration may not be as good as hard blanking duration. However, soft blanking may attempt to strike a balance between the gains of the other system and the restrictions on the system under consideration. Also soft blanking can be beneficial compared to not doing anything.

The balance between the two systems during soft blanking can be calculated after collecting some information from the mobile devices. From the restricted system, such information may involve how much data are there in their buffer and what are the allowable delays that these data can experience, for the real-time applications what are the acceptable minimum data rates. From the favored system, how much data the mobile devices have and what data rate they can achieve, given that the restricted system may be only transmitting lower rates. From this information, the overall scheduler can decide how long the soft blanking may be and the rates of each mobile device on both the systems should transmit.

Some embodiments may utilize soft blanking on a reverse link utilizing tools and techniques similar to centralized T2PInflow. For example, in DO, there can be centralized T2PInflow allocation where a base station controls T2PInflow allocation or autonomous T2PInflow allocation (default mode of operation) where mobile device controls the T2PInflow allocation. While autonomous allocation may be generally more efficient than centralized T2PInflow allocation control; centralized scheme has the potential for faster allocation in cases where there is unutilized capacity that can be dedicated to certain flows.

Centralized allocation can use grants that allocate and/or freeze T2PInflow allocation for some time interval which allows the base station control MAC flow resource allocation over this interval. Grants may occur as often as the base station's scheduler wishes. Thus, centralized allocation can be used during soft blanking to better control which mobile devices and which flows are permitted. Also it can be used during the transition from soft blanking to normal operation, as it can have faster allocation to unutilized capacity during soft blanking. Transition based on FRAB may be slower than centralized allocation FRAB is filtered from the values of RAB over a specified window of RAB samples and may be used to determine the T2P that can be allocated to a given MAC flow. Broadly speaking, the FRAB is the average of the RAB over a time. FRABFilterTC is the IIR filter time constant the mobile device uses for computing the FRAB and the permissible values in the specification are 128, 256, 384, and 512 slots. If the time constant is set low, then the averaging may be more prone to sudden spikes (increases) in loading; while if the time constant is set too long, then the average may be too smooth and variations in the RAB may be underestimated.

Similarly, QRABFilterTC is the IIR filter time constant the mobile devices use for computing the QRAB. The allowed values are 4 and 8 slots. If set too low, the averaging may be more prone to spikes resulting in the QRAB being more likely to be detected as busy. If set too high, the averaging may become too smooth resulting in the QRAB to be more likely to be detected as not busy and may result in excess interference in the system.

For soft RL blanking, embodiments may judiciously use the values of these two constants to help with soft RL blanking.

In addition to autonomous-alone and centralized-alone modes of operation, some embodiments may have a mixed mode of operation during which some of the mobile devices may have to use the grants from the base station while the others operate in the autonomous mode.

Embodiments may be applied to other technologies including, but not limited to, UMTS, WiFi, and/or LTE that may use request and grant mechanisms for allocation.

Some embodiments may utilize hard blanking and soft blanking in conjunction with each other. For example, in cases where tools and techniques similar to ReverseLinkSilenceDuration is not enough, hard blanking and soft blanking can be used consecutively. During hard blanking, all the mobile devices may go silent for ReverseLinkSilenceDuration. At the end of this duration, rather then switching to the normal mode of operation, some embodiments may switch to soft blanking by setting the RAB bit such that the mobile devices may get lower T2PInflow than what it would be in normal mode of operation, hence transmit less, which keeps real-time applications alive and data transmissions under control. At some point, the RAB bit may be set to represent the actual conditions in the system so that the system goes back in the normal mode of operation.

Some embodiments may include power boosting by a mobile device in a flexible bandwidth system during RL blanking in normal bandwidth system. If there is available PA headroom, the reverse can also be done (e.g., power boost by mobile devices in normal WWAN systems during RL blanking in flexible WWAN system). This may be mostly applicable for hard RL blanking but can be extended for soft RL blanking.

Some embodiments may generate reverse link blanking utilizing tools and techniques similar to T2PNoTxFilterTC. This parameter is the filter time constant used to compute the average T2P when the mobile device is in the Open state, but not transmitting on the Reverse Traffic Channel due to not receiving the corresponding Forward Channel. This is typical of hybrid mode operation (e.g., 1x+DO mode). If this parameter is set to a long time constant, then the T2PInflow value may decay less during a 1x tune-away, and comes back to EV-DO mode with a more aggressive transmit power. In an unloaded sector, the mobile device's T2PInflow, upon returning from a tune-away, may be at a similar level compared to that of before the tune-away. This may allow the mobile device to transmit using higher payload sizes, and may increase the instantaneous throughput of that mobile device after returning from the tune-away. If this parameter is set to a short time constant, then the T2PInflow may decay more during a tune-away and the mobile device comes back with a less aggressive transmit power. This may cause excess delay in the ramping of payload sizes transmitted on the Reverse Link. The positive side may be that this would allow smoother variations in the Rise-Over-Thermal in the system after the mobile device returns from a tune-away.

Some embodiments may utilize T2PNoTxFilterTC for hard and/or soft RL blanking. Embodiments may have a time constant to compute the average T2P when the mobile device is not transmitting on the Reverse Traffic Channel due to RL blanking (though receiving the corresponding Forward Channel). If this parameter is set to a long time constant, then the T2PInflow value may decay less during RL blanking and at the end of RL blanking may start with a more aggressive transmit power. In an unloaded sector, the mobile device's T2PInflow upon returning from RL blanking may be at a similar level compared to that before the RL blanking. This may allow the mobile device to transmit using higher payload sizes, and may increase the instantaneous throughput of that mobile after RL blanking. If this parameter is set to a short time constant, then the T2PInflow may decay more during RL blanking and the mobile device may come back with a less aggressive transmit power. This may cause excess delay in the ramping of payload sizes transmitted on the Reverse Link.

The positive side may be that this may allow smoother variations in the Rise-Over-Thermal in the system after the AT returns from RL blanking.

Some embodiments may utilize soft blanking on the normal bandwidth system (or flexible bandwidth systems in some cases) as mentioned above. Soft blanking may include situations where a mobile device, for example, may not be silent as in hard blanking in the data portion of the slots (e.g., completely silent, silent for some channels) but where the base station may transmit less than what the base station would have in the absence of soft blanking, for example. Soft blanking may include transmissions of at least a priority flow or a delay sensitive flow over at least a portion of the blanking duration. Soft blanking may include reducing a power of transmission. In addition to priority or delay sensitive flows, for example, other flows can be scheduled in the "blanked" slots on normal bandwidth systems. In some cases, those flows can be sent with lowered power (on the normal bandwidth system). In some embodiments, even with hard blanking, pilot and/or MAC transmissions might be present.

For collocated systems, where load information of the first and second bandwidth systems may be available to a scheduler, the blanking may be done at a finer granularity, such as at the slot level. The blanking could be triggered by a request response procedure where the second bandwidth system that may require help may send a request to the first bandwidth system and the latter may respond with an acknowledgement or rejects citing a reason.

Some embodiments may utilize non co-located flexible and normal bandwidth systems. The granularity of blanking is relatively coarser for non-collocated systems if the relative load information is not shared. For example, blanking can be done at pre-scheduled times of day. This may assume that the peaks in both systems do not happen at the same time due to different traffic distributions. A flexible non co-located base station, for example, can request normal bandwidth mobile device to blank at a certain time or times when it may want to receive data from another mobile device far away.

Figure 4:
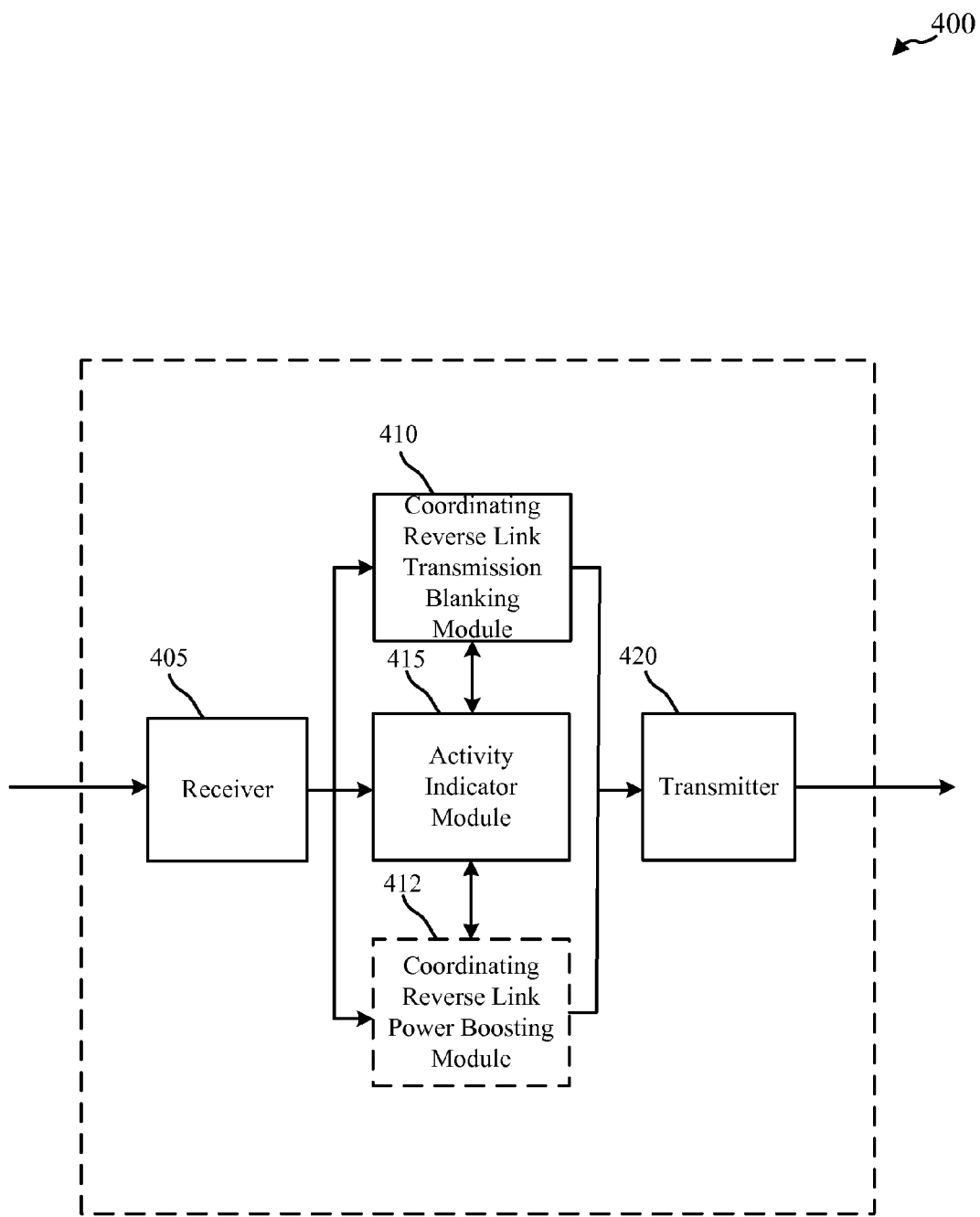
FIG. 4 shows a block diagram of a device configured to increase reverse link throughput in accordance with various embodiments.

Turning next to FIG. 4, a block diagram illustrates a device 400 for increasing reverse link throughput in accordance with various embodiments. The device 400 may be an example of one or more aspects of base stations 105 described with reference to FIG. 1, FIG. 2, FIG. 3, FIG. 6, and/or FIG. 8. The device 400 may also be a processor. The device 400 may include a receiver module 405, a coordinating reverse link transmission blanking module 410, an activity indicator module 415, and/or a transmitter module 420. Some embodiments include a coordinating reverse link power boosting module 412. Each of these components may be in communication with each other.

These components of the device 400 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 405 may receive information such as packet, data, and/or signaling information regarding what device 400 has received or transmitted. The received information may be utilized by the coordinating reverse link transmission blanking module 410 for a variety of purposes.

The receiver module 405 may be configured to identify multiple bandwidth carriers, such as first carrier bandwidth and a second carrier bandwidth. The second carrier bandwidth may partially overlap the first carrier bandwidth. The activity indicator module 415 may determine activity level on at least the first carrier bandwidth or the second carrier bandwidth. Based on that determination, the coordinating reverse link transmission blanking module 410 may transmit, through transmitter 420, an indicator, such as a first indicator, to a mobile device to generate a transmission blanking on a reverse link over the first carrier bandwidth from the first mobile device responsive to the determined activity level. In some embodiments, transmitting at least a first indicator based on the determined one or more activity levels is used to coordinate a transmission blanking on a reverse link over the first carrier bandwidth with respect to the second carrier bandwidth. The indicators may be transmitted to one or more mobile devices. In some embodiments, the coordinating reverse link transmission blanking module 410 coordinates the transmission blanking on the reverse link over the first carrier bandwidth such that the blanking occurs during a concurrent transmission over the second carrier bandwidth.

In some embodiments, the coordinating reverse link transmission blanking module 410 transmitting, through transmitter 420, at least the first indicator based on the determined one or more activity levels to coordinate the transmission blanking on the reverse link over the first carrier bandwidth with respect to the second carrier bandwidth further includes coordinating a hard transmission blanking on the reverse link over the first carrier bandwidth based on at least the first transmitted indicator. The coordinating reverse link transmission blanking module 410 transmitting, through transmitter 420, at least the first indicator, based on the determined one or more activity levels, to coordinate the transmission blanking on the reverse link over the first carrier bandwidth with respect to the second carrier bandwidth may further include coordinating a soft transmission blanking on the reverse link over the first carrier bandwidth based on at least the first transmitted indicator. Coordinated transmission blanking may include transmissions during a portion of the coordinated transmission blanking less than an entire period of the coordinated transmission blanking; this may be applicable to soft blanking and/or hard blanking. Some embodiments include transitioning from the coordinated soft transmission blanking to a coordinated hard transmission blanking, or vice versa.

In some embodiments, the coordinating reverse link transmission blanking module 410 transmitting, through transmitter 420, may be configured such that at least the first carrier bandwidth or the second carrier bandwidth utilizes licensed spectrum. In some embodiments, the first carrier bandwidth and the second carrier bandwidth utilize different radio access technologies (RATs). For example, in one embodiment, the first carrier bandwidth utilizes LTE, while the second carrier bandwidth utilizes EV-DO, or vice versa.

The coordinating reverse link transmission blanking module 410 and/or activity indicator module 415 may utilize different indicators. The indicators may include, but are not limited to, indicators that are a function of a Reverse Activity Bit (RAB), an RAB-like indicator, a ReverseLinkSilenceDuration, a ReverseLinkSilenceDuration-like indicator, a T2PInflow allocation, and/or a T2PInflow allocation-like indicator. As mentioned above, the coordinating reverse link transmission blanking module 410 may be configured such that the transmission blanking may include hard blanking, soft blanking, or a combination of hard blanking and soft blanking. In some embodiments, the first carrier bandwidth is a normal bandwidth and the second carrier bandwidth is a flexible bandwidth. The normal carrier bandwidth may fully overlap the flexible carrier bandwidth.

In some embodiments, device 400 may be further configured through transmitter 420 to coordinate a transmission power increase over the second carrier bandwidth during the transmission blanking over the first carrier bandwidth. For example, some embodiments include a coordinating reverse link power boosting module 412 that is used to transmit, through transmitter 420, at least a second indicator based on the determined one or more activity levels to coordinate a power transmission increase on a reverse link over the second carrier bandwidth with respect to the first carrier bandwidth.

In some embodiments, the receiver module 405 may be further configured to include identifying a third carrier bandwidth different from the second carrier bandwidth, where the third carrier bandwidth at least partially overlaps the first carrier bandwidth. The third carrier bandwidth may be scaled utilizing the same scaling factor as the second carrier bandwidth or a different scaling factor from the second carrier bandwidth in some cases. The reverse link blanking module 410 may be further configured to determine an activity level on at least the first carrier bandwidth or the third carrier bandwidth may be determined. An indicator based on the determination may be transmitted by the reverse link blanking module 410 to the first mobile device to generate a transmission blanking on the reverse link over the first carrier bandwidth from the first mobile device responsive to the determined activity level. This use of a third or more carrier bandwidths may be referred to as multi-carrier embodiments. These multi-carrier embodiments can be co-located or at a different location.

The coordinating reverse link transmission blanking module 410 and/or coordinating reverse link power boosting module 412 may be configured to provide other functions. For example, the coordinated transmission blanking over the first carrier bandwidth may occur at a slot level. Some embodiments include increasing at least a data rate of at least a control channel or data channel utilizing a power increase over the second carrier bandwidth. Some embodiments include increasing a power of transmission over the first carrier bandwidth during a period of time different than the coordinated transmission blanking over the first carrier bandwidth. Coordinating a concurrent transmission over the second carrier bandwidth may occur during one or more slots when the first carrier bandwidth is not transmitting. In some embodiments, at least coordinating a transmission blanking on the reverse link over the first carrier bandwidth during a concurrent transmission over the second carrier bandwidth or increasing the power of transmission over the second carrier bandwidth during the coordinated transmission blanking on the reverse link over the first carrier bandwidth may depend at least upon a relative loading of the first carrier bandwidth with respect to the second carrier bandwidth or time of day.

Figure 5:
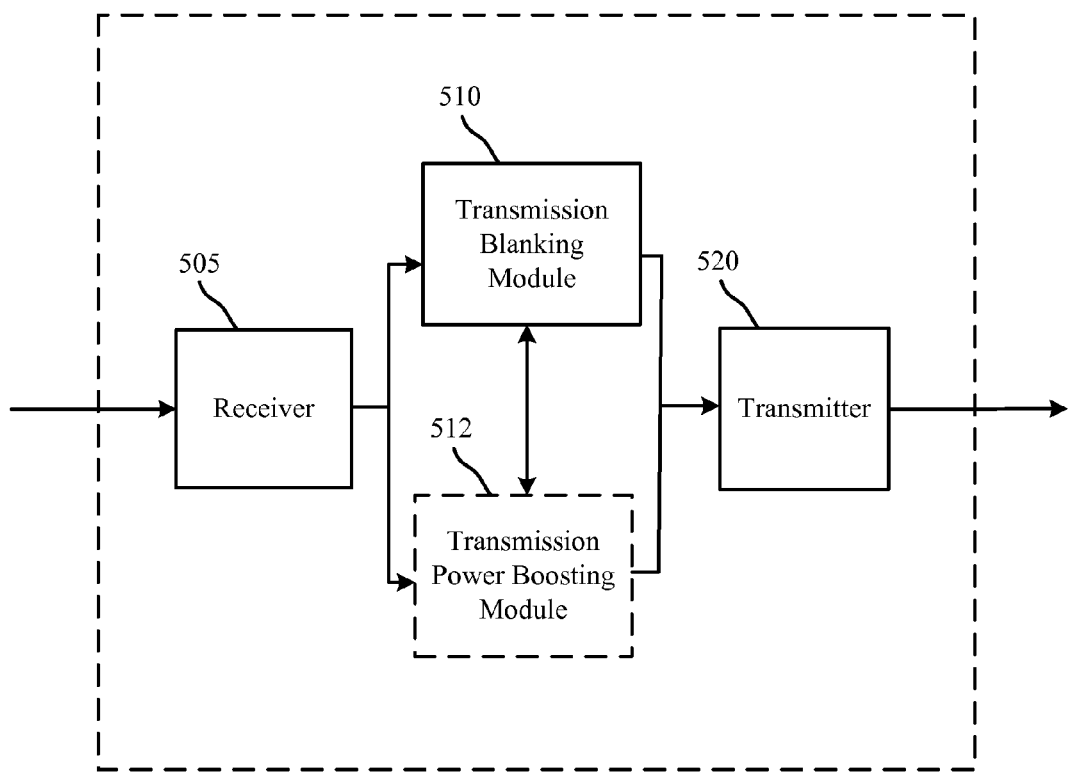
FIG. 5 shows a block diagram of a device configured to increase reverse link throughput in accordance with various embodiments.

Turning next to FIG. 5, a block diagram illustrates a device 500 for increasing reverse link throughput in accordance with various embodiments. The device 500 may be an example of one or more aspects of mobile devices 115 described with reference to FIG. 1, FIG. 2, FIG. 3, FIG. 6, FIG. 7, and/or FIG. 8. The device 500 may also be a processor. The device 500 may include a receiver module 505, a transmission blanking module 510, and/or a transmitter module 520. Device 500 may include a transmission power boosting module 512. Each of these components may be in communication with each other. Device 500 and/or its components may be configured to receive the transmission from a device such as device 400 of FIG. 4, for example.

These components of the device 500 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 505 may receive information such as packet, data, and/or signaling information regarding what device 500 has received or transmitted. The received information may be utilized by the transmission blanking module 510 and/or transmission power boosting module 512 for a variety of purposes.

In some embodiments, the receiver module 505 may be configured to receive an indicator, such as a load indicator. The load indicator may be received at a mobile device, for example. The indicator may be configured for coordinating a transmission blanking on a reverse link over a carrier bandwidth, such as a first carrier bandwidth. The transmission blanking module 510 may utilize at least the received indicator to coordinate the transmission blanking on the reverse link over the first carrier bandwidth during a concurrent transmission over a second carrier bandwidth that at least partially overlaps the first carrier bandwidth.

In some embodiments, the transmission blanking module utilizes at least the first received indicator to coordinate the transmission blanking on the reverse link over the first carrier bandwidth during the concurrent transmission over the second carrier bandwidth that partially overlaps the first carrier bandwidth, the transmission blanking in order to perform a hard transmission blanking on the reverse link over the first carrier bandwidth utilizing at least the first received indicator. The transmission blanking module may utilize at least the first received indicator to coordinate the transmission blanking on the reverse link over the first carrier bandwidth during the concurrent transmission over the second carrier bandwidth that partially overlaps the first carrier bandwidth, the transmission blanking in order to perform a soft transmission blanking on the reverse link over the first carrier bandwidth utilizing at least the first received indicator. Coordinated transmission blanking may include transmissions during a portion of the coordinated transmission blanking less than an entire period of the coordinated transmission blanking; this may be applicable to soft blanking and/or hard blanking. Some embodiments include transitioning from the coordinated soft transmission blanking to a coordinated hard transmission blanking, or vice versa. In some embodiments, the first carrier bandwidth is a normal carrier bandwidth and the second carrier bandwidth is a flexible carrier bandwidth.

The reverse link transmission blanking module 510 may utilize different indicators. The indicators may include, but are not limited to, indicators that are a function of at least a Reverse Activity Bit (RAB), a RAB-like indicator, a ReverseLinkSilenceDuration, a ReverseLinkSilenceDuration-like indicator, a T2PInflow allocation, and/or a T2PInflow allocation-like indicator. The transmission blanking module 510 may be configured such that the transmission blanking may include hard blanking, soft blanking, or a combination of hard blanking and soft blanking. Coordinated soft transmission blanking may include transmissions during a portion of the coordinated soft transmission blanking less than an entire period of the coordinated soft transmission blanking. In some embodiments, when the first carrier bandwidth is a normal carrier bandwidth and the second carrier bandwidth is a flexible carrier bandwidth, the normal carrier bandwidth may completely overlap the flexible carrier bandwidth. In some embodiments, at least the first carrier bandwidth or the second carrier bandwidth utilizes licensed spectrum. In some embodiments, the first carrier bandwidth and the second carrier bandwidth utilize different radio access technologies (RATs). For example, in one embodiment, the first carrier bandwidth utilizes LTE, while the second carrier bandwidth utilizes EV-DO, or vice versa.

In some embodiments, device 500 may be further configured to increase a power of transmission over the second carrier bandwidth during the transmission blanking over the first carrier bandwidth. For example, some embodiments include a transmission power boosting module 512. The transmission power boosting module 512 may increase a power of transmission over the second carrier bandwidth for the concurrent transmission during the coordinated transmission blanking over the first carrier bandwidth. In some embodiments, the transmission blanking module 510 may be further configured to utilize one or more indicators to create a transmission blanking on the reverse link over the first carrier bandwidth during a concurrent transmission over a third carrier bandwidth that partially overlaps the first carrier bandwidth. The coordinated transmission blanking over the first carrier bandwidth may occur at a slot level. Some embodiments include increasing at least a data rate of at least a control channel or data channel utilizing a power increase over the second carrier bandwidth. Some embodiments include increasing a power of transmission over the first carrier bandwidth during a period of time different than the coordinated transmission blanking over the first carrier bandwidth. Coordinating a concurrent transmission over the second carrier bandwidth may occur during one or more slots when the first carrier bandwidth is not transmitting. In some embodiments, at least coordinating a transmission blanking on the reverse link over the first carrier bandwidth during a concurrent transmission over the second carrier bandwidth or increasing the power of transmission over the second carrier bandwidth during the coordinated transmission blanking on the reverse link over the first carrier bandwidth may depend at least upon a relative loading of the first carrier bandwidth with respect to the second carrier bandwidth or time of day.

Figure 6:
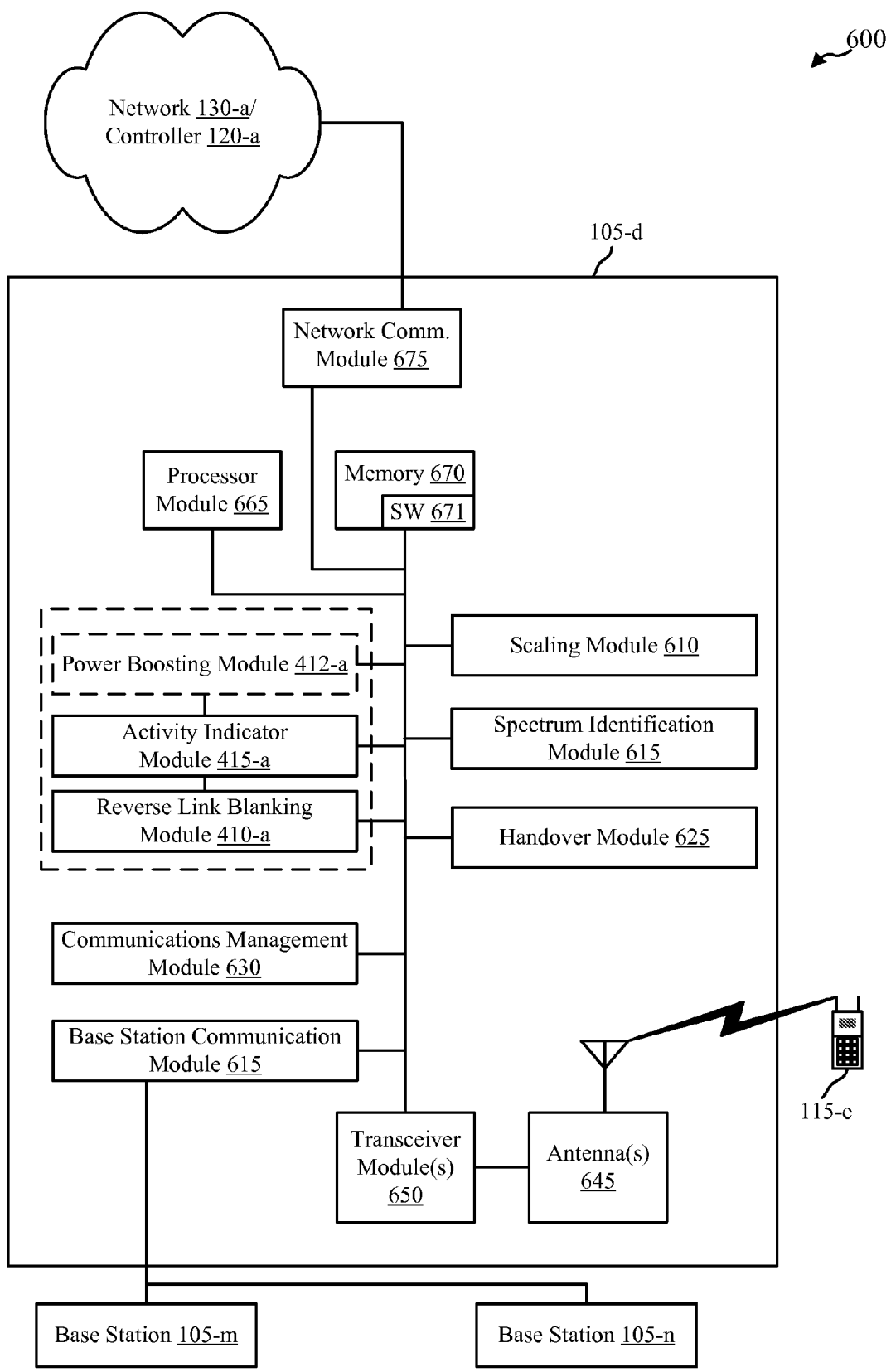
FIG. 6 shows a block diagram of a wireless communications system in accordance with various embodiments.

FIG. 6 shows a block diagram of a communications system 600 that may be configured for utilizing flexible waveforms in accordance with various embodiments. This system 600 may be an example of aspects of the system 100 depicted in FIG. 1, systems 200 of FIG. 2, system 300 of FIG. 3, and/or system 800 of FIG. 8. The base station 105-d may include antennas 645, a transceiver module 650, memory 670, and a processor module 665, which each may be in communication, directly or indirectly, with each other (e.g., over one or more buses). The transceiver module 650 may be configured to communicate bi-directionally, via the antennas 645, with the mobile device 115-e, which may be a multi-mode mobile device. The transceiver module 650 (and/or other components of the base station 105-d) may also be configured to communicate bi-directionally with one or more networks. In some cases, the base station 105-d may communicate with the network 130-a and/or controller 120-a through network communications module 675. Base station 105-d may be an example of an eNodeB base station, a Home eNodeB base station, a NodeB base station, and/or a Home NodeB base station. Controller 120-a may be integrated into base station 105-d in some cases, such as with an eNodeB base station.

Base station 105-d may also communicate with other base stations 105, such as base station 105-m and base station 105-n. Each of the base stations 105 may communicate with mobile device 115-e using different wireless communications technologies, such as different Radio Access Technologies. In some cases, base station 105-d may communicate with other base stations such as 105-m and/or 105-n utilizing base station communication module 615. In some embodiments, base station communication module 615 may provide an X2 interface within an LTE wireless communication technology to provide communication between some of the base stations 105. In some embodiments, base station 105-d may communicate with other base stations through controller 120-a and/or network 130-a.

The memory 670 may include random access memory (RAM) and read-only memory (ROM). The memory 670 may also store computer-readable, computer-executable software code 671 containing instructions that are configured to, when executed, cause the processor module 665 to perform various functions described herein (e.g., call processing, database management, message routing, etc.). Alternatively, the software 671 may not be directly executable by the processor module 665 but be configured to cause the computer, e.g., when compiled and executed, to perform functions described herein.

The processor module 665 may include an intelligent hardware device, e.g., a central processing unit (CPU) such as those made by Intel® Corporation or AMD®, a microcontroller, an application-specific integrated circuit (ASIC), etc. The processor module 665 may include a speech encoder (not shown) configured to receive audio via a microphone, convert the audio into packets (e.g., 30 ms in length) representative of the received audio, provide the audio packets to the transceiver module 650, and provide indications of whether a user is speaking. Alternatively, an encoder may only provide packets to the transceiver module 650, with the provision or withholding/suppression of the packet itself providing the indication of whether a user is speaking.

The transceiver module 650 may include a modem configured to modulate the packets and provide the modulated packets to the antennas 645 for transmission, and to demodulate packets received from the antennas 645. While some examples of the base station 105-d may include a single antenna 645, the base station 105-d preferably includes multiple antennas 645 for multiple links which may support carrier aggregation. For example, one or more links may be used to support macro communications with mobile device 115-e.

According to the architecture of FIG. 6, the base station 105-d may further include a communications management module 630. The communications management module 630 may manage communications with other base stations 105. By way of example, the communications management module 630 may be a component of the base station 105-d in communication with some or all of the other components of the base station 105-d via a bus. Alternatively, functionality of the communications management module 630 may be implemented as a component of the transceiver module 650, as a computer program product, and/or as one or more controller elements of the processor module 665.

The components for base station 105-d may be configured to implement aspects discussed above with respect to device 400 in FIG. 4 and may not be repeated here for the sake of brevity. For example, the reverse link blanking module 410-a may be the coordinating reverse link transmission blanking module 410 of FIG. 4. The power boosting module 412-*a* may be the coordinating reverse link power boosting module 412 of FIG. 4. The activity indicator module 415-*a* may be the activity indicator module 410 of FIG. 4.

The base station 105-*d* may also include a spectrum identification module 615. The spectrum identification module 615 may be utilized to identify spectrum available for flexible waveforms. In some embodiments, a handover module 625 may be utilized to perform handover procedures of the mobile device 115-*e* from one base station 105 to another. For example, the handover module 625 may perform a handover procedure of the mobile device 115-*e* from base station 105-*d* to another where normal waveforms are utilized between the mobile device 115-*e* and one of the base stations and flexible waveforms are utilized between the mobile device and another base station. A scaling module 610 may be utilized to scale and/or alter chip rates to generate flexible waveforms.

In some embodiments, the transceiver module 650 in conjunction with antennas 645, along with other possible components of base station 105-*d*, may transmit information regarding flexible waveforms and/or scaling factors from the base station 105-*d* to the mobile device 115-*e*, to other base stations 105-*m*/105-*n*, or core network 130-*a*. In some embodiments, the transceiver module 650 in conjunction with antennas 645, along with other possible components of base station 105-*d*, may transmit information to the mobile device 115-*e*, to other base stations 105-*m*/105-*n*, or core network 130-*a*, such as flexible waveforms and/or scaling factors, such that these devices or systems may utilize flexible waveforms.

Figure 7:
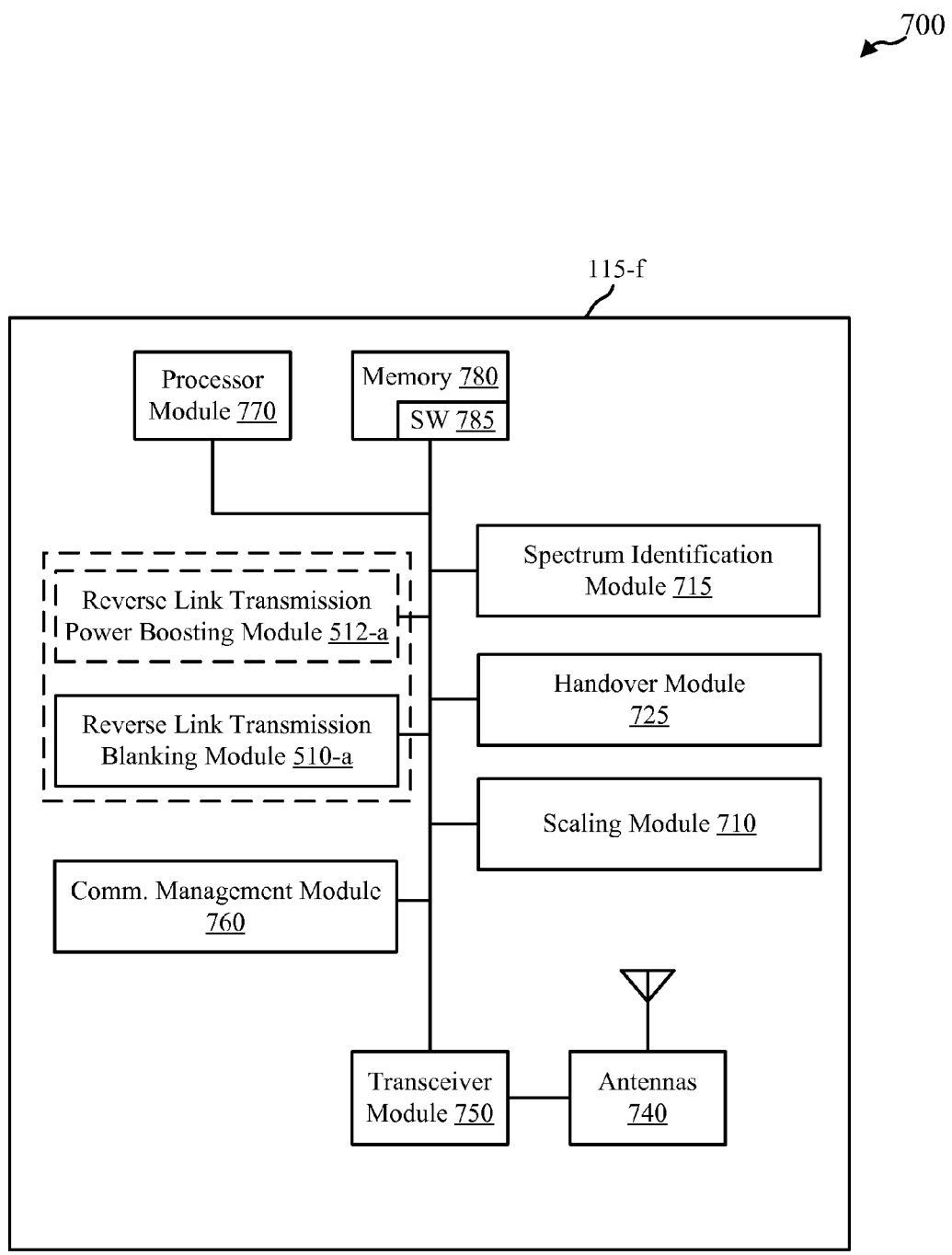
FIG. 7 shows a block diagram of a mobile device in accordance with various embodiments.

FIG. 7 is a block diagram 700 of a mobile device 115-*f* configured to facilitate the use of flexible bandwidth in accordance with various embodiments. The mobile device 115-*f* may have any of various configurations, such as personal computers (e.g., laptop computers, netbook computers, tablet computers, etc.), cellular telephones, PDAs, digital video recorders (DVRs), internet appliances, gaming consoles, e-readers, etc. The mobile device 115-*f* may have an internal power supply (not shown), such as a small battery, to facilitate mobile operation. In some embodiments, the mobile device 115-*f* may be the mobile device 115 of FIG. 1, FIG. 2, FIG. 3, FIG. 6, and/or FIG. 8, and/or the device 500 of FIG. 5. The mobile device 115-*f* may be a multi-mode mobile device. The mobile device 115-*f* may be referred to as a wireless communications device in some cases.

The mobile device 115-*f* may include antennas 740, a transceiver module 750, memory 780, and a processor module 770, which each may be in communication, directly or indirectly, with each other (e.g., via one or more buses). The transceiver module 750 is configured to communicate bi-directionally, via the antennas 740 and/or one or more wired or wireless links, with one or more networks, as described above. For example, the transceiver module 750 may be configured to communicate bi-directionally with base stations 105 of FIG. 1, FIG. 2, FIG. 3, FIG. 6, and/or FIG. 8. The transceiver module 750 may include a modem configured to modulate the packets and provide the modulated packets to the antennas 740 for transmission, and to demodulate packets received from the antennas 740. While the mobile device 115-*f* may include a single antenna, the mobile device 115-*f* will typically include multiple antennas 740 for multiple links.

The memory 780 may include random access memory (RAM) and read-only memory (ROM). The memory 780 may store computer-readable, computer-executable software code 785 containing instructions that are configured to, when executed, cause the processor module 770 to perform various functions described herein (e.g., call processing, database management, message routing, etc.). Alternatively, the software 785 may not be directly executable by the processor module 770 but be configured to cause the computer (e.g., when compiled and executed) to perform functions described herein.

The processor module 770 may include an intelligent hardware device, e.g., a central processing unit (CPU) such as those made by Intel® Corporation or AMD®, a microcontroller, an application-specific integrated circuit (ASIC), etc. The processor module 770 may include a speech encoder (not shown) configured to receive audio via a microphone, convert the audio into packets (e.g., 30 ms in length) representative of the received audio, provide the audio packets to the transceiver module 750, and provide indications of whether a user is speaking. Alternatively, an encoder may only provide packets to the transceiver module 750, with the provision or withholding/suppression of the packet itself providing the indication of whether a user is speaking.

According to the architecture of FIG. 7, the mobile device 115-*f* may further include a communications management module 760. The communications management module 760 may manage communications with other mobile devices 115. By way of example, the communications management module 760 may be a component of the mobile device 115-*f* in communication with some or all of the other components of the mobile device 115-*f* via a bus. Alternatively, functionality of the communications management module 760 may be implemented as a component of the transceiver module 750, as a computer program product, and/or as one or more controller elements of the processor module 770.

The components for mobile device 115-*f* may be configured to implement aspects discussed above with respect to device 500 of FIG. 5 and may not be repeated here for the sake of brevity. For example, the reverse link transmission blanking module 510-*a* may be the transmission blanking module 510 of FIG. 5. The reverse link transmission power boosting module 512-*a* may be the transmission power boosting module 512 of FIG. 5.

The mobile device 115-*f* may also include a spectrum identification module 715. The spectrum identification module 715 may be utilized to identify spectrum available for flexible waveforms. In some embodiments, a handover module 725 may be utilized to perform handover procedures of the mobile device 115-*f* from one base station to another. For example, the handover module 725 may perform a handover procedure of the mobile device 115-*f* from one base station to another where normal waveforms are utilized between the mobile device 115-*f* and one of the base stations and flexible waveforms are utilized between the mobile device and another base station. A scaling module 710 may be utilized to scale and/or alter chip rates to generate flexible waveforms.

In some embodiments, the transceiver module 750 in conjunction with antennas 740, along with other possible components of mobile device 115-*f*, may transmit information regarding flexible waveforms and/or scaling factors from the mobile device 115-*f* to base stations or a core network. In some embodiments, the transceiver module 750, in conjunction with antennas 740 along with other possible components of mobile device 115-*f*, may transmit information, such as flexible waveforms and/or scaling factors, to base stations or a core network such that these devices or systems may utilize flexible waveforms.

Figure 8:
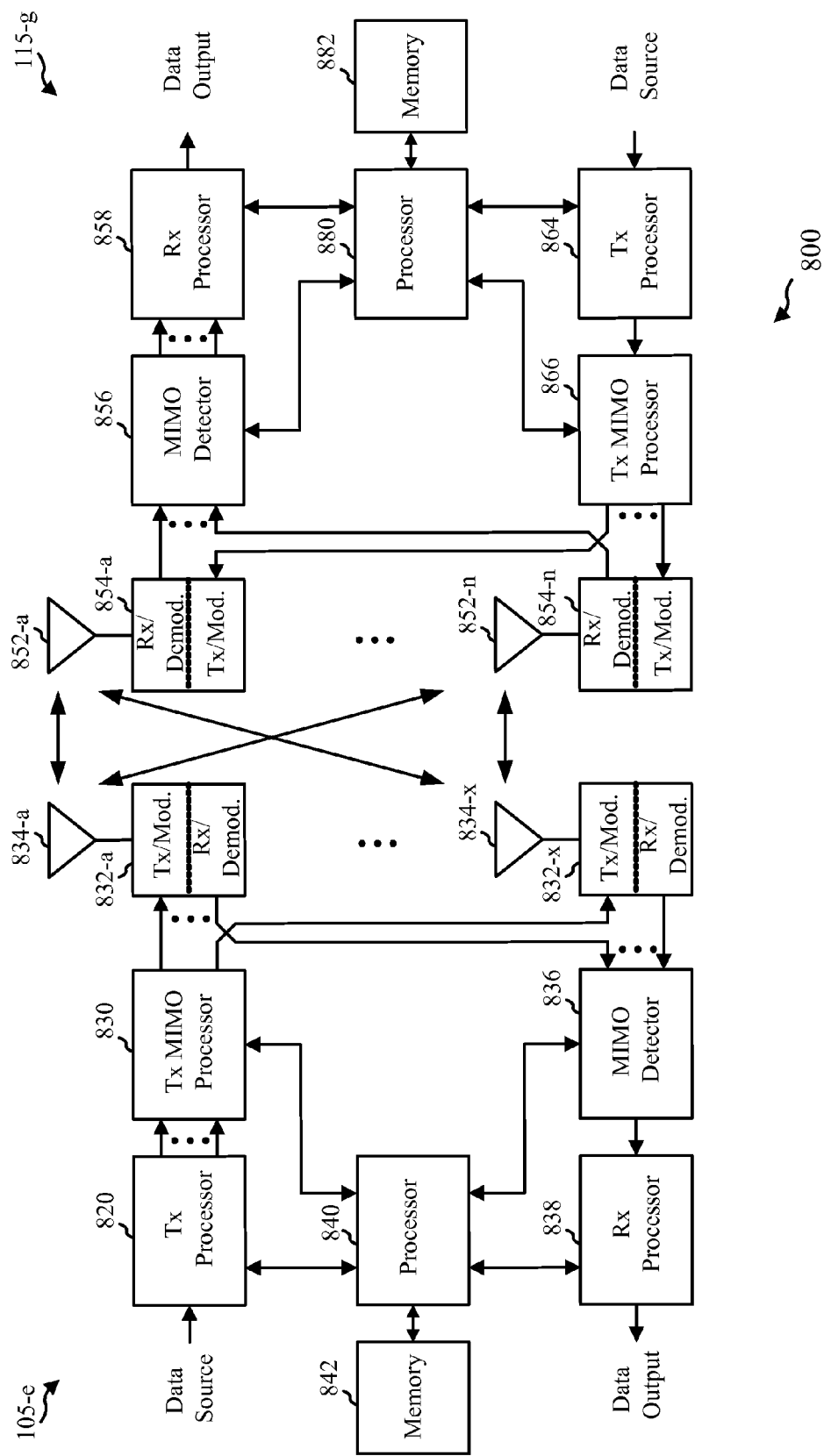
FIG. 8 shows a block diagram of a wireless communications system that includes a base station and a mobile device in accordance with various embodiments.

FIG. 8 is a block diagram of a system 800 including a base station 105-*e* and a mobile device 115-*g* in accordance with various embodiments. This system 800 may be an example of the system 100 of FIG. 1, systems 200 of FIG. 2, system 300 of FIG. 3, and/or system 600 of FIG. 6. The base station 105-e may be equipped with antennas 834-a through 834-x, and the mobile device 115-g may be equipped with antennas 852-a through 852-n. At the base station 105-e, a transmit processor 820 may receive data from a data source.

The transmitter processor 820 may process the data. The transmitter processor 820 may also generate reference symbols, and a cell-specific reference signal. A transmit (TX) MIMO processor 830 may perform spatial processing (e.g., precoding) on data symbols, control symbols, and/or reference symbols, if applicable, and may provide output symbol streams to the transmit modulators 832-a through 832-x. Each modulator 832 may process a respective output symbol stream (e.g., for OFDM, etc.) to obtain an output sample stream. Each modulator 832 may further process (e.g., convert to analog, amplify, filter, and upconvert) the output sample stream to obtain a downlink (DL) signal. In one example, DL signals from modulators 832-a through 832-x may be transmitted via the antennas 834-a through 834-x, respectively. The transmitter processor 820 may receive information from a processor 840. The processor 840 may be configured to generate flexible waveforms through altering a chip rate and/or utilizing a scaling factor; this may be done dynamically in some cases. The processor 840 may also provide for different alignment and/or offsetting procedures. The processor 840 may also utilize scaling and/or chip rate information to perform measurements on the other subsystems, perform handoffs to the other subsystems, perform reselection, etc. The processor 840 may invert the effects of time stretching associated with the use of flexible bandwidth through parameter scaling. In some embodiments, the processor 840 may be implemented as part of a general processor, the transmitter processor 820, and/or the receiver processor 838.

In some embodiments, the processor 840 is configured for increasing reverse link throughput by coordination of multiple wireless systems using reverse link blanking. Base station 105-e may utilize different indicators to prompt a device, such as a mobile device 115-g, to utilize reverse link blanking on a normal bandwidth system to increase throughput for an overlapping flexible bandwidth system, for example. In some embodiments, reverse link blanking may also occur on a flexible bandwidth system. Some embodiments may also utilize power boosting on the reverse link to increase reverse link throughput, such as on the flexible bandwidth system.

At the mobile device 115-g, the mobile device antennas 852-a through 852-n may receive the DL signals from the base station 105-e and may provide the received signals to the demodulators 854-a through 854-n, respectively. Each demodulator 854 may condition (e.g., filter, amplify, downconvert, and digitize) a respective received signal to obtain input samples. Each demodulator 854 may further process the input samples (e.g., for OFDM, etc.) to obtain received symbols. A MIMO detector 856 may obtain received symbols from all the demodulators 854-a through 854-n, perform MIMO detection on the received symbols if applicable, and provide detected symbols. A receive processor 858 may process (e.g., demodulate, deinterleave, and decode) the detected symbols, providing decoded data for the mobile device 115-g to a data output, and provide decoded control information to a processor 880, or memory 882.

On the uplink (UL), at the mobile device 115-g, a transmitter processor 864 may receive and process data from a data source. The transmitter processor 864 may also generate reference symbols for a reference signal. The symbols from the transmitter processor 864 may be precoded by a transmit MIMO processor 866 if applicable, further processed by the demodulators 854-a through 854-n (e.g., for SC-FDMA, etc.), and be transmitted to the base station 105-e in accordance with the transmission parameters received from the base station 105-e. The transmitter processor 864 may also be configured to generate flexible waveforms through altering a chip rate and/or utilizing a scaling factor; this may be done dynamically in some cases. The transmitter processor 864 may receive information from processor 880. The processor 880 may provide for different alignment and/or offsetting procedures. The processor 880 may also utilize scaling and/or chip rate information to perform measurements on the other subsystems, perform handoffs to the other subsystems, perform reselection, etc. The processor 880 may invert the effects of time stretching associated with the use of flexible bandwidth through parameter scaling. At the base station 105-e, the UL signals from the mobile device 115-g may be received by the antennas 834, processed by the demodulators 832, detected by a MIMO detector 836 if applicable, and further processed by a receive processor. The receive processor 838 may provide decoded data to a data output and to the processor 880. In some embodiments, the processor 880 may be implemented as part of a general processor, the transmitter processor 864, and/or the receiver processor 858.

In some embodiments, the processor 880 is configured for increasing reverse link throughput by coordination of multiple wireless systems using reverse link blanking. Mobile device 115-g may utilize different indicators to generate reverse link blanking on a normal bandwidth system to increase throughput for an overlapping flexible bandwidth system. In some embodiments, reverse link blanking may also occur on a flexible bandwidth system. Some embodiments may also utilize power boosting on the reverse link to increase reverse link throughput, such as on the flexible bandwidth system.

Figure 9A:
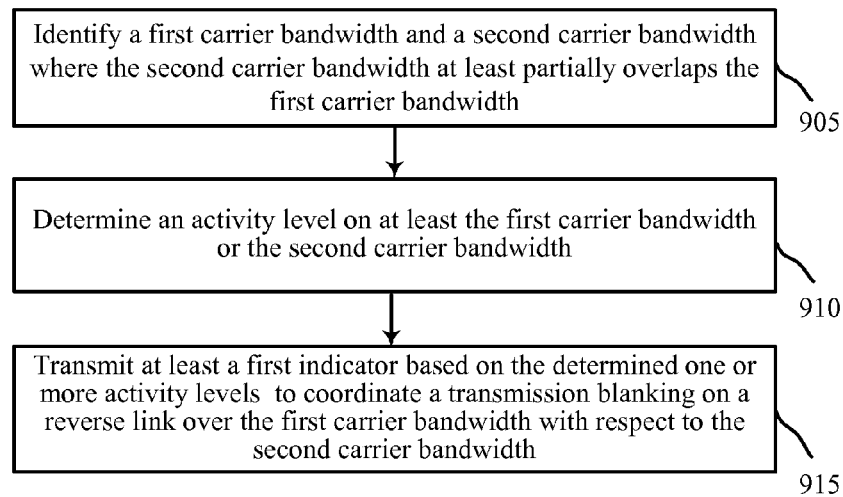
FIG. 9A shows a flow diagram of a method for increase reverse link throughput in a wireless communications system in accordance with various embodiments.

Turning to FIG. 9A, a flow diagram of a method 900-a for increasing reverse link throughput in a wireless communications system in accordance with various embodiments. Method 900-a may be implemented utilizing various wireless communications devices including, but not limited to: a base station 105 as seen in FIG. 1, FIG. 2, FIG. 3, FIG. 6, and/or FIG. 8; and/or a device 400 as seen in FIG. 4. In some embodiments, method 900-a may be implemented utilizing various wireless communications devices including, but not limited to: a mobile device 115 as seen in FIG. 1, FIG. 2, FIG. 3, FIG. 6, FIG. 7, and/or FIG. 8; a device 500 as seen in FIG. 5; and/or a core network 130 and/or controller 120 as seen in FIG. 1 and/or FIG. 6.

At block 905, a first carrier bandwidth and a second carrier bandwidth may be identified. The second carrier bandwidth may at least partially overlap the first carrier bandwidth. At block 910, an activity level on at least the first carrier bandwidth or the second carrier bandwidth may be determined. At block 915, at least a first indicator based on the determined one or more activity levels may be transmitted to coordinate a transmission blanking on a reverse link over the first carrier bandwidth with respect to the second carrier bandwidth.

In some embodiments, a base station transmits the one or more indicators to one or more mobile devices. Coordinating the transmission blanking on the reverse link over the first carrier bandwidth may involve coordinating the transmission blanking such that it occurs during a concurrent transmission over the second carrier bandwidth.

In some embodiments, transmitting at least the first indicator based on the determined one or more activity levels to coordinate the transmission blanking on the reverse link over the first carrier bandwidth with respect to the second carrier bandwidth further includes coordinating a hard transmission blanking on the reverse link over the first carrier bandwidth based on at least the first transmitted indicator. Transmitting at least the first indicator based on the determined one or more activity levels to coordinate the transmission blanking on the reverse link over the first carrier bandwidth with respect to the second carrier bandwidth may further include coordinating a soft transmission blanking on the reverse link over the first carrier bandwidth based on at least the first transmitted indicator. Coordinated transmission blanking may include transmissions during a portion of the coordinated transmission blanking less than an entire period of the coordinated transmission blanking; this may be applicable to soft blanking and/or hard blanking. Some embodiments include transitioning from the coordinated soft transmission blanking to a coordinated hard transmission blanking, or vice versa.

In some embodiments, at least the first carrier bandwidth or the second carrier bandwidth utilizes licensed spectrum. In some embodiments, the first carrier bandwidth and the second carrier bandwidth utilize different radio access technologies (RATs). For example, in one embodiment, the first carrier bandwidth utilizes LTE, while the second carrier bandwidth utilizes EV-DO, or vice versa.

The indicator may include, but is not limited to, an indicator that is a function of a Reverse Activity Bit (RAB), an RAB-like indicator, a ReverseLinkSilenceDuration, a ReverseLinSilenceDuration-like indicator, a T2PInflow allocation, and/or a T2PInflow allocation-like indicator. The transmission blanking may include hard blanking, soft blanking, or a combination of hard blanking and soft blanking. In some embodiments, the first carrier bandwidth is a normal bandwidth and the second bandwidth is a flexible bandwidth. The normal bandwidth may fully overlap the flexible bandwidth.

In some embodiments, method 900-*a* may further include increasing a power transmission over the second carrier bandwidth during the transmission blanking over the first carrier bandwidth. For example, some embodiments include transmitting at least a second indicator based on the determined one or more activity levels to coordinate the power transmission increase on a reverse link over the second carrier bandwidth with respect to the first carrier bandwidth.

In some embodiments, method 900-*a* may further include identifying a third carrier bandwidth different than the second carrier bandwidth, where the third carrier bandwidth at least partially overlaps the first carrier bandwidth. The second carrier bandwidth and the third carrier bandwidth may utilize the same scaling factor or different scaling factors. An activity level on at least the first carrier bandwidth or the third carrier bandwidth may be determined. An indicator based on the determination may be transmitted to the first mobile device to generate a transmission blanking on the reverse link over the first carrier bandwidth from the first mobile device responsive to the determined activity level. This use of a third or more carrier bandwidths may be referred to as multi-carrier embodiments. These multi-carrier embodiments can be co-located or at a different location.

The coordinated transmission blanking over the first carrier bandwidth may occur at a slot level. Some embodiments include increasing at least a data rate of at least a control channel or data channel utilizing a power increase over the second carrier bandwidth. Some embodiments include increasing a power of transmission over the first carrier bandwidth during a period of time different than the coordinated transmission blanking over the first carrier bandwidth. Coordinating a concurrent transmission over the second carrier bandwidth may occur during one or more slots when the first carrier bandwidth is not transmitting. In some embodiments, at least coordinating a transmission blanking on the reverse link over the first carrier bandwidth during a concurrent transmission over the second carrier bandwidth or increasing the power of transmission over the second carrier bandwidth during the coordinated transmission blanking on the reverse link over the first carrier bandwidth may depend at least upon a relative loading of the first carrier bandwidth with respect to the second carrier bandwidth or time of day.

Figure 9B:
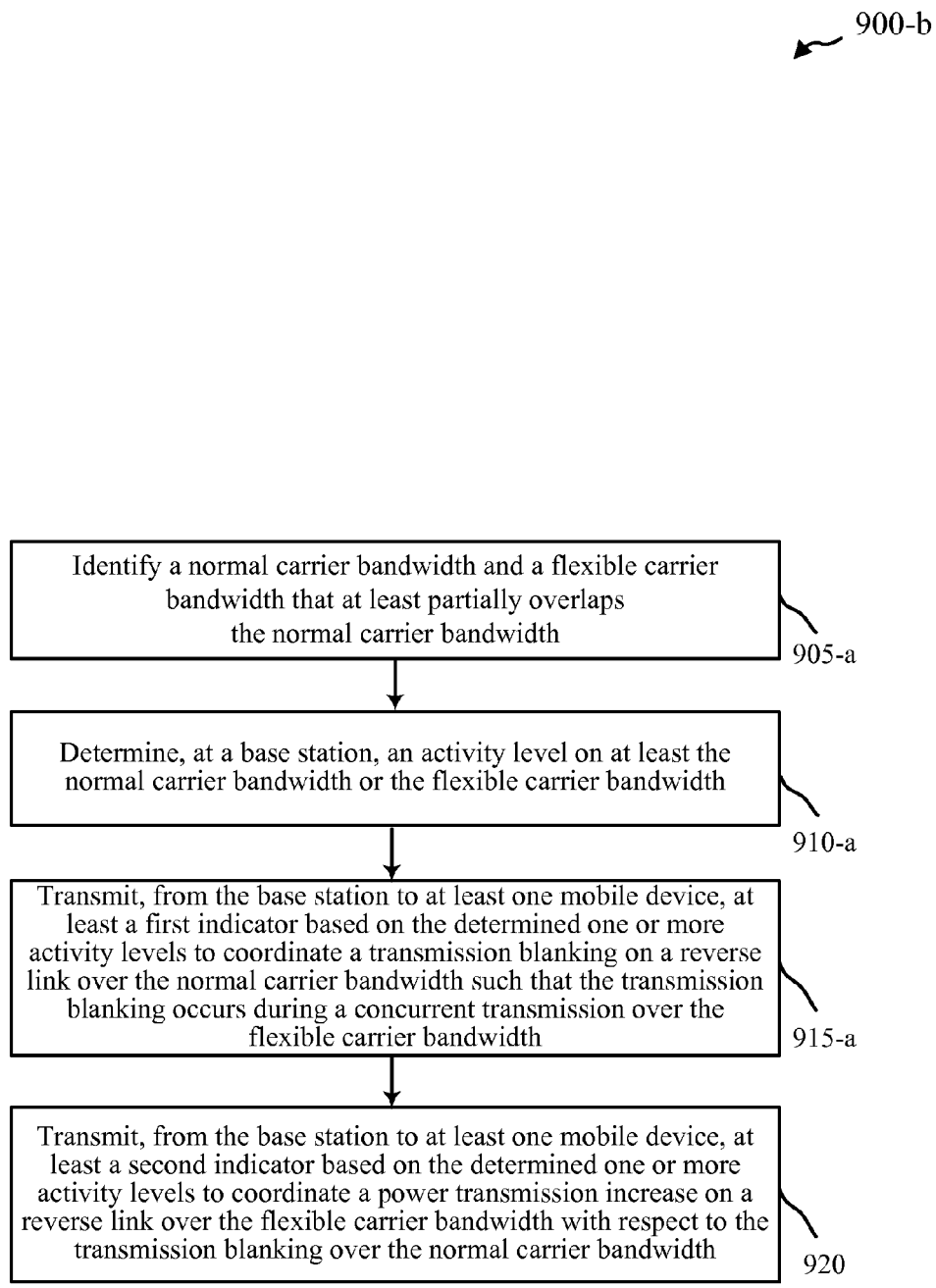
FIG. 9B shows a flow diagram of a method for increase reverse link throughput in a wireless communications system in accordance with various embodiments.

Turning to FIG. 9B, a flow diagram of a method 900-*b* for increasing reverse link throughput in a wireless communications system in accordance with various embodiments. Method 900-*b* may be implemented utilizing various wireless communications devices including, but not limited to: a base station 105 as seen in FIG. 1, FIG. 2, FIG. 3, FIG. 6, and/or FIG. 8; and/or a device 400 as seen in FIG. 4. In some embodiments, method 900-*b* may be implemented utilizing various wireless communications devices including, but not limited to: a mobile device 115 as seen in FIG. 1, FIG. 2, FIG. 3, FIG. 6, FIG. 7, and/or FIG. 8; a device 500 as seen in FIG. 5; and/or a core network 130 and/or controller 120 as seen in FIG. 1 and/or FIG. 6. Method 900-*b* may be an example of an embodiment of method 900-*a* of FIG. 9A.

At block 905-*a*, a normal carrier bandwidth and a flexible carrier bandwidth may be identified. The flexible carrier bandwidth may at least partially overlap the normal carrier bandwidth. At block 910-*a*, an activity level on at least the normal carrier bandwidth or the flexible carrier bandwidth may be determined at a base station. At block 915-*a*, at least a first indicator based on the determined one or more activity levels may be transmitted to a mobile device to coordinate a transmission blanking on a reverse link over the normal carrier bandwidth with respect to the flexible carrier bandwidth. The transmission blanking may be coordinated such that it occurs during a concurrent transmission over the flexible carrier bandwidth. At block 920, at least a second indicator may be transmitted, from the base station to at least one mobile device, based on the determined one or more activity levels to coordinate a power transmission increase on a reverse link over the flexible carrier bandwidth with respect to the transmission blanking over the normal carrier bandwidth.

Figure 9C:
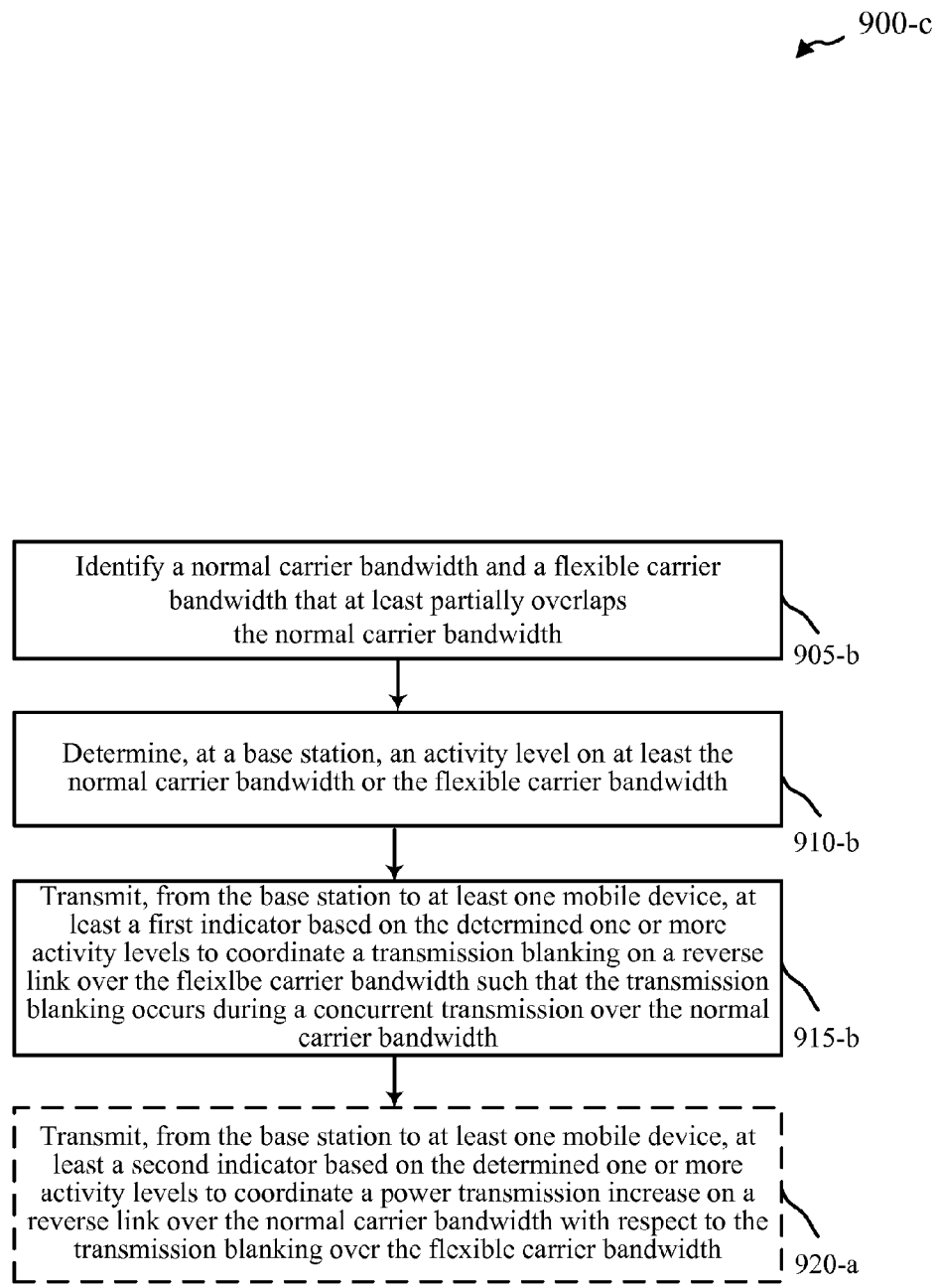
FIG. 9C shows a flow diagram of a method for increase reverse link throughput in a wireless communications system in accordance with various embodiments.

Turning to FIG. 9C, a flow diagram of a method 900-*c* for increasing reverse link throughput in a wireless communications system in accordance with various embodiments. Method 900-*c* may be implemented utilizing various wireless communications devices including, but not limited to: a base station 105 as seen in FIG. 1, FIG. 2, FIG. 3, FIG. 6, and/or FIG. 8; and/or a device 400 as seen in FIG. 4. In some embodiments, method 900-*b* may be implemented utilizing various wireless communications devices including, but not limited to: a mobile device 115 as seen in FIG. 1, FIG. 2, FIG. 3, FIG. 6, FIG. 7, and/or FIG. 8; a device 500 as seen in FIG. 5; and/or a core network 130 and/or controller 120 as seen in FIG. 1 and/or FIG. 6. Method 900-*b* may be an example of an embodiment of method 900-*a* of FIG. 9A.

At block 905-*b*, a normal carrier bandwidth and a flexible carrier bandwidth may be identified. The flexible carrier bandwidth may at least partially overlap the normal carrier bandwidth. At block 910-*b*, an activity level on at least the normal carrier bandwidth or the flexible carrier bandwidth may be determined at a base station. At block 915-*b*, at least a first indicator based on the determined one or more activity levels may be transmitted to at least one mobile device to coordinate a transmission blanking on a reverse link over the flexible carrier bandwidth with respect to the normal carrier bandwidth. The transmission blanking may be coordinated such that it occurs during a concurrent transmission over the normal carrier bandwidth. In some embodiments, at least a second indicator may be transmitted, from the base station to at least one mobile device, based on the determined one or more activity levels to coordinate a power transmission increase on a reverse link over the normal carrier bandwidth with respect to the transmission blanking over the flexible carrier bandwidth as shown in block 920-*a*.

Figure 10A:
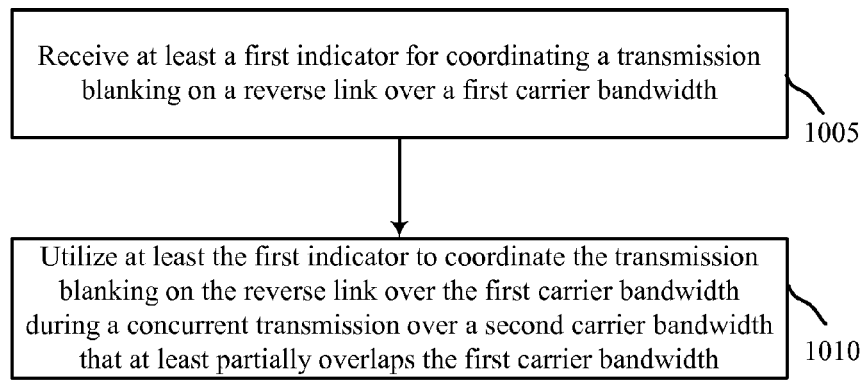
FIG. 10A shows a flow diagram of a method for increased reverse link throughput in a wireless communications system in accordance with various embodiments.

Turning to FIG. 10A, a flow diagram of a method 1000-*a* for increasing reverse link throughput in a wireless communications system in accordance with various embodiments. Method 1000-*a* may be implemented utilizing various wireless communications devices including, but not limited to: a mobile device 115 as seen in FIG. 1, FIG. 2, FIG. 3, FIG. 6, FIG. 7, and/or FIG. 8; a device as seen in FIG. 5. In some embodiments, method 1000-*a* may be implemented utilizing various wireless communications devices including, but not limited to: a base station 105 as seen in FIG. 1, FIG. 2, FIG. 3, FIG. 6, and/or FIG. 8; a device 400 as seen in FIG. 4; and/or a core network 130 and/or controller 120 as seen in FIG. 1 and/or FIG. 6.

At block 1005, at least one indicator may be received for coordinating a transmission blanking on a reverse link over a first carrier bandwidth. The one or more indicators may be load indicators. The indicator may be received at a mobile device, for example. At block 1010, at least one indicator may be utilized to coordinate the transmission blanking on the reverse link over the first carrier bandwidth during a concurrent transmission over a second carrier bandwidth that at least partially overlaps the first carrier bandwidth.

In some embodiments, utilizing at least the first received indicator to coordinate the transmission blanking on the reverse link over the first carrier bandwidth during the concurrent transmission over the second carrier bandwidth that partially overlaps the first carrier bandwidth the transmission includes performing a hard transmission blanking on the reverse link over the first carrier bandwidth utilizing at least the first received indicator. Utilizing at least the first received indicator to coordinate the transmission blanking on the reverse link over the first carrier bandwidth during the concurrent transmission over the second carrier bandwidth that partially overlaps the first carrier bandwidth; the transmission blanking may include performing a soft transmission blanking on the reverse link over the first carrier bandwidth utilizing at least the first received indicator. Coordinated transmission blanking may include transmissions during a portion of the coordinated transmission blanking less than an entire period of the coordinated transmission blanking; this may be applicable to soft blanking and/or hard blanking. Some embodiments include transitioning from the coordinated soft transmission blanking to a coordinated hard transmission blanking, or vice versa.

The one or more indicators may include, but are not limited to, an indicator that is a function of a Reverse Activity Bit (RAB), an RAB-like indicator, a ReverseLinkSilenceDuration, a ReverseLinkSilenceDuration-like indicator, a T2PInflow allocation, and/or a T2PInflow allocation-like indicator. The transmission blanking may include hard blanking, soft blanking, or a combination of hard blanking and soft blanking. In some embodiments, the first carrier bandwidth is a normal bandwidth and the second bandwidth is a flexible bandwidth. The normal bandwidth may completely overlap the flexible bandwidth.

In some embodiments, method 1000-*a* may further include increasing a power of transmission over the second carrier bandwidth during the transmission blanking over the first carrier bandwidth. In some embodiments, method 1000-*a* may further include utilizing the load indicator to create a transmission blanking on the reverse link over the first carrier bandwidth during a concurrent transmission over a third carrier bandwidth that partially overlaps the first carrier bandwidth.

Figure 10B:
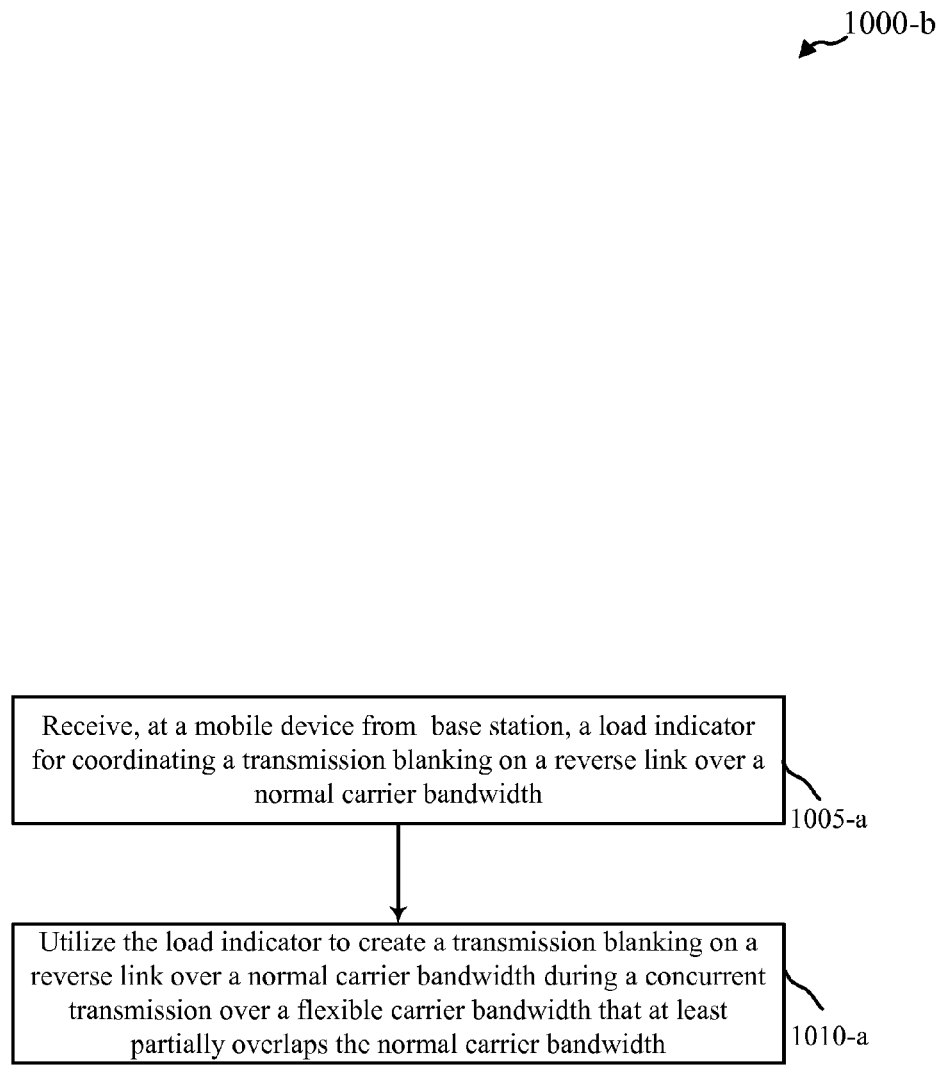
FIG. 10B shows a flow diagram of a method for increased reverse link throughput in a wireless communications system in accordance with various embodiments.

Turning to FIG. 10B, a flow diagram of a method 1000-*b* for increasing reverse link throughput in a wireless communications system in accordance with various embodiments. Method 1000-*b* may be implemented utilizing various wireless communications devices including, but not limited to: a mobile device 115 as seen in FIG. 1, FIG. 2, FIG. 3, FIG. 6, FIG. 7, and/or FIG. 8; a device as seen in FIG. 5. In some embodiments, method 1000-*b* may be implemented utilizing various wireless communications devices including, but not limited to: a base station 105 as seen in FIG. 1, FIG. 2, FIG. 3, FIG. 6, and/or FIG. 8; a device 400 as seen in FIG. 4; and/or a core network 130 and/or controller 120 as seen in FIG. 1 and/or FIG. 6. Method 1000-*b* may be a specific embodiment of method 1000-*a* of FIG. 10A.

At block 1005-*a*, a load indicator may be received, at a mobile device from a base station, for coordinating a transmission blanking on a reverse link over a normal carrier bandwidth. The one or more indicators may be load indicators. At block 1010-*a*, the mobile device may utilize the load indicator to coordinate the transmission blanking on the reverse link over the normal carrier bandwidth during a concurrent transmission over a flexible carrier bandwidth that at least partially overlaps the normal carrier bandwidth.

Figure 10C:
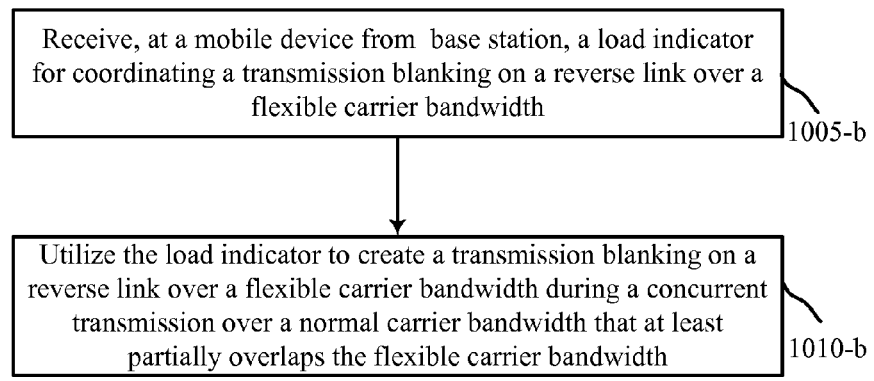
FIG. 10C shows a flow diagram of a method for increased reverse link throughput in a wireless communications system in accordance with various embodiments.

Turning to FIG. 10C, a flow diagram of a method 1000-*c* for increasing reverse link throughput in a wireless communications system in accordance with various embodiments. Method 1000-*c* may be implemented utilizing various wireless communications devices including, but not limited to: a mobile device 115 as seen in FIG. 1, FIG. 2, FIG. 3, FIG. 6, FIG. 7, and/or FIG. 8; a device as seen in FIG. 5. In some embodiments, method 1000-*b* may be implemented utilizing various wireless communications devices including, but not limited to: a base station 105 as seen in FIG. 1, FIG. 2, FIG. 3, FIG. 6, and/or FIG. 8; a device 400 as seen in FIG. 4; and/or a core network 130 and/or controller 120 as seen in FIG. 1 and/or FIG. 6. Method 1000-*c* may be a specific embodiment of method 1000-*a* of FIG. 10A.

At block 1005-*b*, a load indicator may be received, at a mobile device from a base station, for coordinating a transmission blanking on a reverse link over a flexible carrier bandwidth. The one or more indicators may be load indicators. At block 1010-*b*, the mobile device may utilize the load indicator to coordinate the transmission blanking on the reverse link over the flexible carrier bandwidth during a concurrent transmission over a normal carrier bandwidth that at least partially overlaps the flexible carrier bandwidth.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general-purpose or special-purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of increasing reverse link throughput in a wireless communications system, the method comprising:
    identifying a first carrier bandwidth and a second carrier bandwidth, wherein the second carrier bandwidth at least partially overlaps the first carrier bandwidth, and wherein the first carrier bandwidth is a normal carrier bandwidth and the second carrier bandwidth is a flexible carrier bandwidth;
    determining an activity level on at least the first carrier bandwidth or the second carrier bandwidth; and
    transmitting at least a first indicator based on the determined one or more activity levels to coordinate a transmission blanking on a reverse link over the first carrier bandwidth with respect to the second carrier bandwidth, wherein the transmitting comprises coordinating a soft transmission blanking on the reverse link over the first carrier bandwidth based on at least the first transmitted indicator.

2. The method of claim 1, further comprising:
    transmitting at least a second indicator based on the determined one or more activity levels to coordinate a power transmission increase on a reverse link over the second carrier bandwidth with respect to the first carrier bandwidth.

3. The method of claim 1, wherein transmitting at least the first indicator based on the determined one or more activity levels to coordinate the transmission blanking on the reverse link over the first carrier bandwidth with respect to the second carrier bandwidth further comprising:
    coordinating a hard transmission blanking on the reverse link over the first carrier bandwidth based on at least the first transmitted indicator.

4. The method of claim 1, wherein the coordinated transmission blanking comprises a transmission during a portion of the coordinated transmission blanking less than an entire period of the coordinated soft transmission blanking.

5. The method of claim 1, further comprising:
    transitioning the coordinated soft transmission blanking to a coordinated hard transmission blanking.

6. The method of claim 1, wherein the normal carrier bandwidth fully overlaps the flexible carrier bandwidth.

7. The method of claim 1, wherein at least the first carrier bandwidth or the second carrier bandwidth utilizes licensed spectrum.

8. The method of claim 1, wherein the first carrier bandwidth and the second carrier bandwidth utilize different radio access technologies (RAT).

9. The method of claim 1, wherein the first indicator comprises an indicator that is a function of at least a Reverse Activity Bit (RAB) or a RAB-like indicator.

10. The method of claim 1, wherein the first indicator comprises an indicator that is a function of at least a ReverseLinkSilenceDuration or a ReverseLinkSilenceDuration-like indicator.

11. The method of claim 1, wherein the first indicator comprises an indicator that is a function of at least a T2PInflow allocation or a T2PInflow allocation-like indicator.

12. The method of claim 1, wherein the coordinated transmission blanking comprises a combination of hard blanking and soft blanking.

13. The method of claim 1, wherein the coordinated transmission blanking over the first carrier bandwidth occurs at a slot level.

14. The method of claim 1, wherein transmitting the first indicator occurs at a base station.

15. The method of claim 1, wherein the at least the first indicator is transmitted to one or more mobile devices.

16. The method of claim 1, wherein transmission blanking on the reverse link over the first carrier bandwidth is coordinated to occur during a concurrent transmission over the second carrier bandwidth.

17. The method of claim 1, further comprising:
coordinating an increase for at least a data rate of at least a control channel or data channel utilizing a power increase over the second carrier bandwidth.

18. The method of claim 1, further comprising:
coordinating a power transmission increase over the first carrier bandwidth during a period of time different than the coordinated transmission blanking over the first carrier bandwidth.

19. The method of claim 1, further comprising, coordinating a concurrent transmission over the second carrier bandwidth during one or more slots when the first carrier bandwidth is not transmitting.

20. The method of claim 1, further comprising:
coordinating a transmission blanking on the reverse link over the second carrier bandwidth during a concurrent transmission over the first carrier bandwidth.

21. The method of claim 20, wherein coordinating a transmission blanking on the reverse link over the second carrier bandwidth during the concurrent transmission over the first carrier bandwidth depends at least upon a relative loading of the first carrier bandwidth with respect to the second carrier bandwidth or a time of day.

22. The method of claim 1, further comprising:
identifying a third carrier bandwidth different from the second carrier bandwidth, wherein the third carrier bandwidth at least partially overlaps the first carrier bandwidth;
determining an activity level on at least the first carrier bandwidth or the third carrier bandwidth; and
transmitting at least a third indicator based on the determination to a first mobile device to generate a coordinated transmission blanking on the reverse link over the first carrier bandwidth from the first mobile device responsive to the determined activity level.

23. A wireless communications system configured for increasing reverse link throughput, the system comprising:
means for identifying a first carrier bandwidth and a second carrier bandwidth, wherein the second carrier bandwidth at least partially overlaps the first carrier bandwidth, and wherein the first carrier bandwidth is a normal carrier bandwidth and the second carrier bandwidth is a flexible carrier bandwidth;
means for determining an activity level on at least the first carrier bandwidth or the second carrier bandwidth;
means for transmitting at least a first indicator based on the determined one or more activity levels to coordinate a transmission blanking on a reverse link over the first carrier bandwidth with respect to the second carrier bandwidth; and
means for coordinating a soft transmission blanking on the reverse link over the first carrier bandwidth based on at least the first transmitted indicator as part of transmitting at least the first indicator.

24. The wireless communications system of claim 23, further comprising:
means for transmitting at least a second indicator based on the determined one or more activity levels to coordinate a power transmission increase on a reverse link over the second carrier bandwidth with respect to the first carrier bandwidth.

25. The wireless communications system of claim 23, further comprising:
means for coordinating a hard transmission blanking on the reverse link over the first carrier bandwidth based on at least the first transmitted indicator as part of transmitting at least the first indicator.

26. The wireless communications system of claim 23, wherein the first indicator comprises an indicator that is a function of at least a Reverse Activity Bit (RAB) or a RAB-like indicator.

27. A computer program product for increasing reverse link throughput in a wireless communications system comprising:
a non-transitory computer-readable medium comprising:
code for identifying a first carrier bandwidth and a second carrier bandwidth, wherein the second carrier bandwidth at least partially overlaps the first carrier bandwidth, and wherein the first carrier bandwidth is a normal carrier bandwidth and the second carrier bandwidth is a flexible carrier bandwidth;
code for determining an activity level on at least the first carrier bandwidth or the second carrier bandwidth;
code for transmitting at least a first indicator based on the determined one or more activity levels to coordinate a transmission blanking on a reverse link over the first carrier bandwidth with respect to the second carrier bandwidth; and
code for coordinating a soft transmission blanking on the reverse link over the first carrier bandwidth based on at least the first transmitted indicator as part of transmitting at least the first indicator.

28. The computer program product of claim 27, wherein the non-transitory computer-readable medium further comprising:
code for transmitting at least a second indicator based on the determined one or more activity levels to coordinate a power transmission increase on a reverse link over the second carrier bandwidth with respect to the first carrier bandwidth.

29. The computer program product of claim 27, wherein the non-transitory computer-readable medium further comprising:
code for coordinating a hard transmission blanking on the reverse link over the first carrier bandwidth based on at least the first transmitted indicator as part of transmitting at least the first indicator.

30. The computer program product of claim 27, wherein the first indicator comprises an indicator that is a function of at least a ReverseLinkSilenceDuration or a ReverseLinkSilenceDuration-like indicator.

31. A wireless communications device configured for increasing reverse link throughput, the device comprising:
at least one processor configured to:
identify a first carrier bandwidth and a second carrier bandwidth, wherein the second carrier bandwidth at least partially overlaps the first carrier bandwidth, and wherein the first carrier bandwidth is a normal carrier bandwidth and the second carrier bandwidth is a flexible carrier bandwidth;

determine an activity level on at least the first carrier bandwidth or the second carrier bandwidth;

transmit at least a first indicator based on the determined one or more activity levels to coordinate a transmission blanking on a reverse link over the first carrier bandwidth with respect to the second carrier bandwidth; and coordinate a soft transmission blanking on the reverse link over the first carrier bandwidth based on at least the first transmitted indicator as part of transmitting at least the first indicator; and at least one memory coupled with the at least one processor.

32. The wireless communications device of claim 31, wherein the at least one processor is further configured to:

transmit at least a second indicator based on the determined one or more activity levels to coordinate a power transmission increase on a reverse link over the second carrier bandwidth with respect to the first carrier bandwidth.

33. The wireless communications device of claim 31, wherein the at least one processor is further configured to:

coordinate a hard transmission blanking on the reverse link over the first carrier bandwidth based on at least the first transmitted indicator as part of transmitting at least the first indicator.

34. The wireless communications device of claim 31, wherein the first indicator comprises an indicator that is a function of at least a T2PInflow allocation or a T2PInflow allocation-like indicator.

35. A method of increasing reverse link throughput in a wireless communications system, the method comprising:

receiving at least a first indicator for coordinating a transmission blanking on a reverse link over a first carrier bandwidth; and utilizing at least the first received indicator to coordinate the transmission blanking on the reverse link over the first carrier bandwidth during a concurrent transmission over a second carrier bandwidth that at least partially overlaps the first carrier bandwidth, wherein the first carrier bandwidth is a normal carrier bandwidth and the second carrier bandwidth is a flexible carrier bandwidth, and wherein the transmission blanking comprises performing a soft transmission blanking on the reverse link over the first carrier bandwidth utilizing at least the first received indicator.

36. The method of claim 35, wherein utilizing at least the first received indicator to coordinate the transmission blanking on the reverse link over the first carrier bandwidth during the concurrent transmission over the second carrier bandwidth that partially overlaps the first carrier bandwidth the transmission blanking comprises:

performing a hard transmission blanking on the reverse link over the first carrier bandwidth utilizing at least the first received indicator.

37. The method of claim 35, wherein the first indicator comprises an indicator that is a function of at least a Reverse Activity Bit (RAB) or a RAB-like indicator.

38. The method of claim 35, wherein the first indicator comprises an indicator that is a function of at least a ReverseLinkSilenceDuration or a ReverseLinkSilenceDuration-like indicator.

39. The method of claim 35, wherein the first indicator comprises an indicator that is a function of at least a T2PInflow allocation or a T2PInflow allocation-like indicator.

40. The method of claim 35, wherein the transmission blanking comprises a combination of hard blanking and soft blanking.

41. The method of claim 35, wherein receiving at least the first indicator occurs at a mobile device.

42. The method of claim 35, further comprising:

increasing a power of transmission over the second carrier bandwidth for the concurrent transmission during the coordinated transmission blanking over the first carrier bandwidth.

43. The method of claim 35, further comprising:

utilizing at least the first indicator or a second indicator to create a coordinated transmission blanking on the reverse link over the first carrier bandwidth during a concurrent transmission over a third carrier bandwidth that partially overlaps the first carrier bandwidth.

44. A wireless communications system configured for increasing reverse link throughput, the system comprising:

means for receiving at least a first indicator for coordinating a transmission blanking on a reverse link over a first carrier bandwidth;

means for utilizing at least the first received indicator to coordinate the transmission blanking on the reverse link over the first carrier bandwidth during a concurrent transmission over a second carrier bandwidth that at least partially overlaps the first carrier bandwidth, wherein the first carrier bandwidth is a normal carrier bandwidth and the second carrier bandwidth is a flexible carrier bandwidth; and means for performing a soft transmission blanking on the reverse link over the first carrier bandwidth as part of utilizing at least the first received indicator.

45. The wireless communications system of claim 44, further comprising:

means for performing a hard transmission blanking on the reverse link over the first carrier bandwidth as part of utilizing at least the first received indicator.

46. The wireless communications system of claim 44, wherein the first indicator comprises an indicator that is a function of at least a Reverse Activity Bit (RAB) or a RAB-like indicator.

47. A computer program product for increasing reverse link throughput in a wireless communications system comprising:

a non-transitory computer-readable medium comprising:

code for receiving at least a first indicator for coordinating a transmission blanking on a reverse link over a first carrier bandwidth;

code for utilizing at least the first received indicator to coordinate the transmission blanking on the reverse link over the first carrier bandwidth during a concurrent transmission over a second carrier bandwidth that at least partially overlaps the first carrier bandwidth, wherein the first carrier bandwidth is a normal carrier bandwidth and the second carrier bandwidth is a flexible carrier bandwidth; and code for performing a soft transmission blanking on the reverse link over the first carrier bandwidth as part of utilizing at least the first received indicator.

48. The computer program product of claim 47, wherein the non-transitory computer-readable medium further comprising:

code for performing a hard transmission blanking on the reverse link over the first carrier bandwidth as part of utilizing at least the first received indicator.

49. The computer program product of claim 47, wherein the first indicator comprises an indicator that is a function of at least a ReverseLinkSilenceDuration or a ReverseLinkSilenceDuration-like indicator.

50. A wireless communications device configured for increasing reverse link throughput, the device comprising:
at least one processor configured to:
receive at least a first indicator for coordinating a transmission blanking on a reverse link over a first carrier bandwidth;
utilize at least the first received indicator to coordinate the transmission blanking on the reverse link over the first carrier bandwidth during a concurrent transmission over a second carrier bandwidth that at least partially overlaps the first carrier bandwidth, wherein the first carrier bandwidth is a normal carrier bandwidth and the second carrier bandwidth is a flexible carrier bandwidth; and
perform a soft transmission blanking on the reverse link over the first carrier bandwidth as part of utilizing at least the first received indicator; and
at least one memory coupled with the at least one processor.

51. The wireless communications device of claim 50, wherein the at least one processor further configured to:
perform a hard transmission blanking on the reverse link over the first carrier bandwidth as part of utilizing at least the first received indicator.

52. The wireless communications device of claim 50, wherein the first indicator comprises an indicator that is a function of at least a T2PInflow allocation or a T2PInflow allocation-like indicator.

53. A method of increasing reverse link throughput in a wireless communications system, the method comprising:
identifying a first carrier bandwidth and a second carrier bandwidth, wherein the second carrier bandwidth at least partially overlaps the first carrier bandwidth, and wherein the first carrier bandwidth is a normal carrier bandwidth and the second carrier bandwidth is a flexible carrier bandwidth;
determining an activity level on at least the first carrier bandwidth or the second carrier bandwidth;
transmitting at least a first indicator based on the determined one or more activity levels to coordinate a transmission blanking on a reverse link over the first carrier bandwidth with respect to the second carrier bandwidth; and
transmitting at least a second indicator based on the determined one or more activity levels to coordinate a power transmission increase on a reverse link over the second carrier bandwidth with respect to the first carrier bandwidth.

54. The method of claim 53, wherein the coordinated transmission blanking comprises at least one of hard blanking or soft blanking.

55. A wireless communications device configured for increasing reverse link throughput, the device comprising:
at least one processor configured to:
identify a first carrier bandwidth and a second carrier bandwidth, wherein the second carrier bandwidth at least partially overlaps the first carrier bandwidth, and wherein the first carrier bandwidth is a normal carrier bandwidth and the second carrier bandwidth is a flexible carrier bandwidth;
determine an activity level on at least the first carrier bandwidth or the second carrier bandwidth;
transmit at least a first indicator based on the determined one or more activity levels to coordinate a transmission blanking on a reverse link over the first carrier bandwidth with respect to the second carrier bandwidth; and
transmit at least a second indicator based on the determined one or more activity levels to coordinate a power transmission increase on a reverse link over the second carrier bandwidth with respect to the first carrier bandwidth; and
at least one memory coupled with the at least one processor.

56. The wireless communications device of claim 55, wherein the coordinated transmission blanking comprises at least one of hard blanking or soft blanking.

57. A method of increasing reverse link throughput in a wireless communications system, the method comprising:
identifying a first carrier bandwidth and a second carrier bandwidth, wherein the second carrier bandwidth at least partially overlaps the first carrier bandwidth, and wherein the first carrier bandwidth is a normal carrier bandwidth and the second carrier bandwidth is a flexible carrier bandwidth;
determining an activity level on at least the first carrier bandwidth or the second carrier bandwidth; and
transmitting at least a first indicator based on the determined one or more activity levels to coordinate a transmission blanking on a reverse link over the first carrier bandwidth with respect to the second carrier bandwidth, wherein the transmitting comprises coordinating a hard transmission blanking on the reverse link over the first carrier bandwidth based on at least the first transmitted indicator.

58. A wireless communications device configured for increasing reverse link throughput, the device comprising:
at least one processor configured to:
identify a first carrier bandwidth and a second carrier bandwidth, wherein the second carrier bandwidth at least partially overlaps the first carrier bandwidth, and wherein the first carrier bandwidth is a normal carrier bandwidth and the second carrier bandwidth is a flexible carrier bandwidth, determine an activity level on at least the first carrier bandwidth or the second carrier bandwidth;
transmit at least a first indicator based on the determined one or more activity levels to coordinate a transmission blanking on a reverse link over the first carrier bandwidth with respect to the second carrier bandwidth; and
coordinate a hard transmission blanking on the reverse link over the first carrier bandwidth based on at least the first transmitted indicator as part of transmitting at least the first indicator; and
at least one memory coupled with the at least one processor.

59. A method of increasing reverse link throughput in a wireless communications system, the method comprising:
receiving at least a first indicator for coordinating a transmission blanking on a reverse link over a first carrier bandwidth; and
utilizing at least the first received indicator to coordinate the transmission blanking on the reverse link over the first carrier bandwidth during a concurrent transmission over a second carrier bandwidth that at least partially overlaps the first carrier bandwidth, wherein the first carrier bandwidth is a normal carrier bandwidth and the second carrier bandwidth is a flexible carrier bandwidth, and wherein the transmission blanking comprises performing a hard transmission blanking on the reverse link over the first carrier bandwidth utilizing at least the first received indicator.

60. A wireless communications device configured for increasing reverse link throughput, the device comprising:

at least one processor configured to:
  receive at least a first indicator for coordinating a transmission blanking on a reverse link over a first carrier bandwidth;
  utilize at least the first received indicator to coordinate the transmission blanking on the reverse link over the first carrier bandwidth during a concurrent transmission over a second carrier bandwidth that at least partially overlaps the first carrier bandwidth, wherein the first carrier bandwidth is a normal carrier bandwidth and the second carrier bandwidth is a flexible carrier bandwidth; and
  perform a hard transmission blanking on the reverse link over the first carrier bandwidth as part of utilizing at least the first received indicator; and
at least one memory coupled with the at least one processor.

* * * * *